(12) United States Patent
Ganesan et al.

(10) Patent No.: US 12,452,917 B2
(45) Date of Patent: Oct. 21, 2025

(54) UPDATING A CONTENTION WINDOW SIZE

(71) Applicant: Lenovo (Singapore) PTE. LTD., New Tech Park (SG)

(72) Inventors: Karthikeyan Ganesan, Kronberg im Taunus (DE); Alexander Johann Maria Golitschek Edler von Elbwart, Darmstadt (DE); Ankit Bhamri, Rödermark (DE); Ali Ramadan Ali, Kraiburg am Inn (DE); Vijay Nangia, Woodridge, IL (US); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 460 days.

(21) Appl. No.: 17/996,913

(22) PCT Filed: Apr. 22, 2021

(86) PCT No.: PCT/IB2021/053339
§ 371 (c)(1),
(2) Date: Oct. 21, 2022

(87) PCT Pub. No.: WO2021/214709
PCT Pub. Date: Oct. 28, 2021

(65) Prior Publication Data
US 2023/0164835 A1 May 25, 2023

Related U.S. Application Data

(60) Provisional application No. 63/014,029, filed on Apr. 22, 2020.

(51) Int. Cl.
*H04W 74/08* (2024.01)
*H04W 74/0808* (2024.01)

(52) U.S. Cl.
CPC .............. *H04W 74/0808* (2013.01)

(58) Field of Classification Search
CPC ... H04L 1/1812; H04L 1/1825; H04L 1/1864; H04L 1/187; H04L 5/0055; H04W 72/046; H04W 74/002; H04W 74/0808
See application file for complete search history.

(56) References Cited

U.S. PATENT DOCUMENTS

| 10,588,159 B2* | 3/2020 | Zhang ................. H04B 7/0478 |
| 10,681,730 B2* | 6/2020 | Mukherjee ............ H04L 5/0055 |

(Continued)

FOREIGN PATENT DOCUMENTS

| CN | 110114990 A | 8/2019 |
| EP | 3654722 A1 | 5/2020 |

(Continued)

OTHER PUBLICATIONS

PCT/IB2021/053339, "Notification of Transmittal of the International Search Report and the Written Opinion of the International Searching authority, or the Declaration", International Searching Authority, Jun. 29, 2021, pp. 1-113.

(Continued)

*Primary Examiner* — Alpus Hsu
(74) *Attorney, Agent, or Firm* — Kunzler Bean & Adamson

(57) ABSTRACT

Apparatuses, methods, and systems are disclosed for adjusting a contention window size. One apparatus includes a processor and a transceiver comprising a plurality of transmit panels. The transceiver initiates a first channel occupancy ("CO") using at least one transmit panel in response to a successful Listen-Before-Talk procedure and transmits a directional transmission using a first transmit panel, the first transmit panel selected from the plurality of transmit panels. The processor determines whether the directional (Continued)

transmission was successfully received by a recipient and updates a first contention window size specific to the first transmit panel. The processor performs a subsequent Listen-Before-Talk procedure using the updated first contention window size prior to a subsequent directional transmission using the first transmit panel.

19 Claims, 8 Drawing Sheets

(56) References Cited

U.S. PATENT DOCUMENTS

| | | | |
|---|---|---|---|
| 10,687,219 B2* | 6/2020 | Yerramalli | H04W 74/0816 |
| 10,779,289 B2* | 9/2020 | Myung | H04L 1/18 |
| 2012/0127969 A1 | 5/2012 | He et al. | |
| 2017/0188387 A1* | 6/2017 | Mukherjee | H04L 1/1812 |
| 2019/0289614 A1 | 9/2019 | Li et al. | |
| 2020/0236709 A1* | 7/2020 | Park | H04W 74/0816 |
| 2020/0244403 A1* | 7/2020 | Talarico | H04L 5/0044 |
| 2020/0252806 A1* | 8/2020 | Yerramalli | H04L 27/0006 |
| 2020/0260486 A1* | 8/2020 | Zhou | H04W 28/0278 |
| 2020/0275482 A1* | 8/2020 | Oh | H04W 74/0825 |
| 2020/0359230 A1* | 11/2020 | Yerramalli | H04W 74/0808 |
| 2021/0168849 A1 | 6/2021 | Oh et al. | |
| 2021/0298075 A1* | 9/2021 | Talarico | H04L 1/1854 |
| 2022/0109532 A1* | 4/2022 | Talarico | H04L 27/0006 |
| 2022/0183063 A1* | 6/2022 | Talarico | H04W 74/0808 |

FOREIGN PATENT DOCUMENTS

| | | |
|---|---|---|
| KR | 20190017608 A | 2/2019 |
| WO | 2019157919 A1 | 8/2019 |
| WO | 2019210185 A1 | 10/2019 |
| WO | 2020022650 A1 | 1/2020 |
| WO | 2020032783 A1 | 2/2020 |

OTHER PUBLICATIONS

Vivo, "Potential solutions and techniques for NR unlicensed spectrum", 3GPP TSG RAN WG1 Meeting #92 R1-1801557, Feb. 26-Mar. 2, 2018, pp. 1-6.

Intel Corporation, "New SID: Study on supporting NR from 52.6GHz to 71 GHz", 3GPP TSG RAN Meeting #86 RP-193259, Dec. 9-12, 2019, pp. 1-3.

3GPP, "3rd Generation Partnership Project; Technical Specification Group Radio Access Network; Physical layer procedures for shared spectrum channel access (Release 16)", 3GPP TS 37.213 V16.1.0, Mar. 2020, pp. 1-25.

3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.

3GPP, "3rd Generation Partnership Project; Technical Specification Group Radio Access Network; NR; Medium Access Control (MAC) protocol specification (Release 16)", 3GPP TS 38.321 V16.0.0, Mar. 2020, pp. 1-141.

* cited by examiner

UPDATING A CONTENTION WINDOW SIZE

CROSS-REFERENCE TO RELATED APPLICATIONS

This application claims priority to U.S. Provisional Patent Application No. 63/014,029 entitled "CONTENTION WINDOW SIZE ADJUSTMENT PROCEDURE" and filed on Apr. 22, 2020 for Karthikeyan Ganesan, Alexander Johann Maria Golitschek Edler von Elbwart, Ankit Bhamri, Ali Ramadan Ali, Vijay Nangia and Ravi Kuchibhotla, which application is incorporated herein by reference.

FIELD

The subject matter disclosed herein relates generally to wireless communications and more particularly relates to adjusting the size of a contention window.

BACKGROUND

In certain wireless communication systems, service is supplemented by operation on unlicensed spectrum. However, operation on unlicensed spectrum requires Clear Channel Assessment ("CCA") prior to transmission, for example involving a Listen-Before-Talk ("LBT") procedure.

In Third generation Partnership Project ("3GPP") New Radio in Unlicensed Spectrum ("NR-U"), channel access in both downlink ("DL") and uplink ("UL") relies on the CCA (e.g., LBT procedure) to gain channel access. Prior to any transmission, the gNB (i.e., 5th generation ("5G") base station) and/or the User Equipment ("UE") must first sense the channel to find out whether there are ongoing communications on the channel No beamforming is considered for LBT in NR-U in Release 16 ("Rel-16") and only omni-directional LBT is assumed.

BRIEF SUMMARY

Disclosed are procedures for adjusting a contention window size. Said procedures may be implemented by apparatus, systems, methods, or computer program products.

One method of a User Equipment device ("UE") includes performing a Listen-Before-Talk ("LBT") procedure for a set of transmit beams. The method includes performing a Physical Uplink Control Channel ("PUCCH") transmission on at least one beam of the set of transmit beams in response to successful LBT for a transmit beam and determining, at the UE, whether the PUCCH transmission was successfully received by a Radio Access Network ("RAN") node. The second method includes updating a contention window size ("CWS") corresponding to each beam used in the PUCCH transmission, wherein a separate CWS is maintained for each transmit beam. In one embodiment, each CWS is adjusted to a next allowed value in response to determining that the PUCCH transmission was not successfully received by the RAN node. In another embodiment, each CWS is set to a minimum value in response to determining that the PUCCH transmission was successfully received by the RAN node.

One method of a communication device (e.g., a UE or gNB) includes initiating a first channel occupancy using at least one transmit beam in response to a successful LBT procedure and transmitting a directional transmission using a first transmit beam, the first transmit beam selected from a plurality of transmit beams. The first method includes determining, at the communication device, whether the directional transmission was successfully received by a recipient and updating a first CWS specific to the first transmit beam, where a separate CWS is maintained for each transmit beam that initiated the first channel occupancy. In one embodiment, updating the first CWS includes adjusting a first CWS to a next allowed value in response to determining that the directional transmission was not successfully received by the recipient. In another embodiment, updating the first CWS includes setting the first CWS to a minimum value in response to determining that the directional transmission was successfully received by the recipient. The first method includes performing a subsequent LBT procedure using the updated first CWS prior to a subsequent directional transmission using the first transmit beam.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
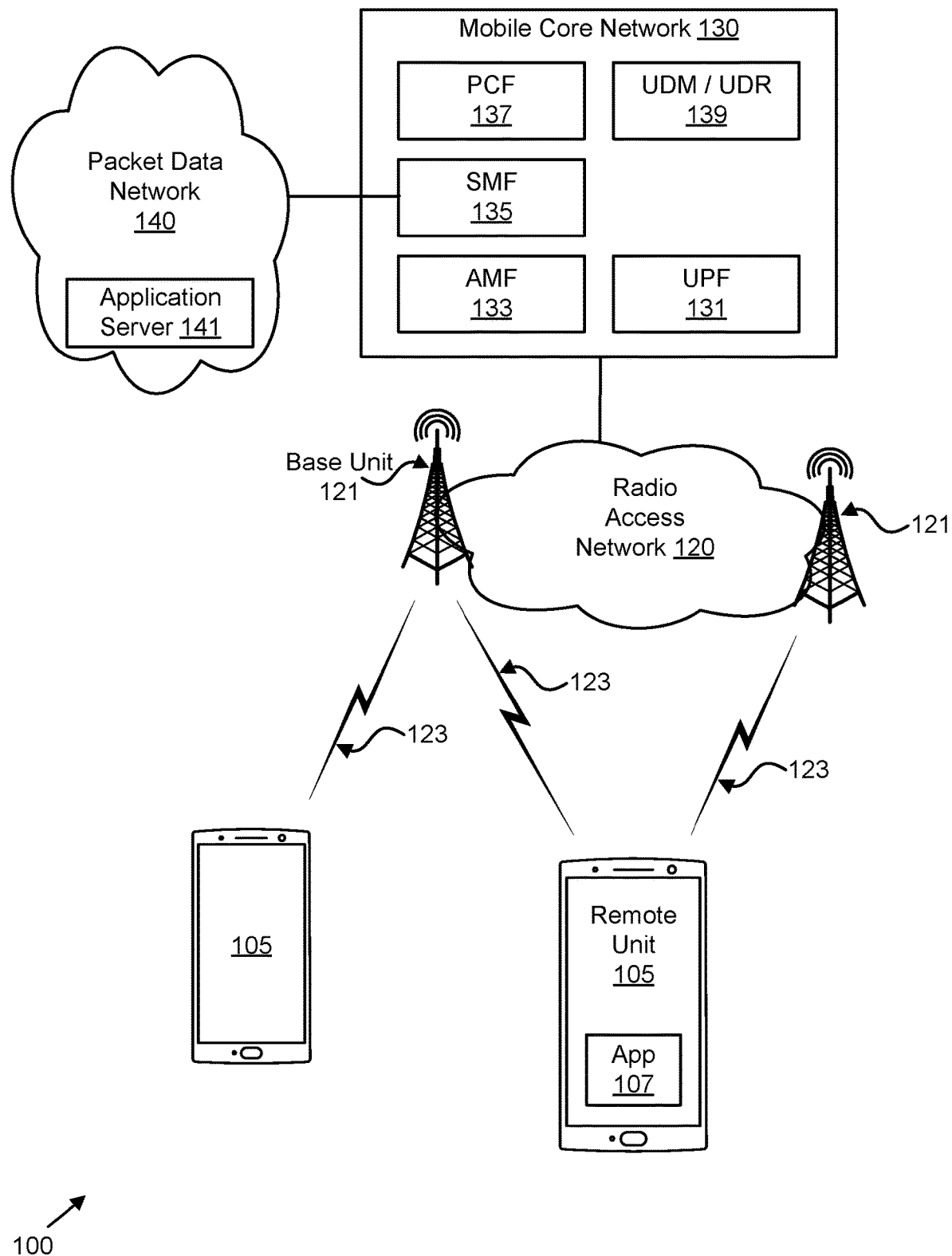
FIG. 1 is a schematic block diagram illustrating one embodiment of a wireless communication system for irregular subcarrier spacing.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for adjusting a contention window size. The present disclosure deals with the channel access mechanism in unlicensed band for high frequency range—namely, Frequency Range 2 ("FR2", e.g., including includes frequency bands from 24.25 GHz to 52.6 GHz) and beyond. More specifically, as beam-based operation is assumed for unlicensed spectrum in FR2 and operating frequencies above 52.6 GHz, it is crucial to perform LBT in a specific beam direction(s) rather than omni-directional LBT.

In NR-U, channel access in both downlink and uplink relies on the LBT; however, no beamforming is considered for LBT in NR-U in Rel-16 and only omni-directional LBT is assumed. A MAC layer entity of the UE relies on reception of a notification of UL LBT failure from the Physical layer to detect a consistent UL LBT failure. The NR-U LBT procedures for channel access can be summarized as follows:

A) Both gNB-initiated and UE-initiated Channel Occupant Times ("COTs") use Category 4 ("Cat-4") LBT where the start of a new transmission burst always perform LBT with exponential back-off. Only with exception, when the DRS must be at most one ms in duration and is not multiplexed with unicast PDSCH. As used herein, a Cat-4 LBT procedure refers to LBT with a random back-off and with a variable size contention window.

B) UL transmission within a gNB initiated Channel Occupancy Time ("COT") or a subsequent DL transmission within a UE or gNB initiated COT can transmit immediately without sensing only if the gap from the end of the previous transmission is not more than 16 µs, otherwise Category 2 ("Cat-2") LBT must be used, and the gap cannot exceed 25 µs. As used herein, a Cat-2 LBT procedure refers to LBT without random back-off.

In various embodiments, the PUCCH reception status may be determined in one of the following ways: A) Based on the comparison of toggled/un-toggled NDIs reception from the subsequent DCIs with the corresponding transmitted HARQ feedback report; B) Based on the comparison of DAI value in the subsequent DCI with the corresponding transmitted HARQ feedback report; or C) Explicit indication in the DCI informs the CWS adjustment for PUCCH.

For CW adjustment for transmissions including PDSCH and PUSCH: if new HARQ feedback is available relative to the prior CW update, the feedback for the latest COT for which new feedback is received shall be used: if the HARQ feedback is ACK, CW is to be set to CWmin. if the HARQ feedback is NACK (or if in absence of feedback within a window as defined below, the gNB or the UE retransmits the TB), CW is to be set to min(CW×2+1, CWmax).

The Contention Window starts at the end of the reference duration and has a duration of max (X ms, the duration of the transmission burst from start of the reference duration+1 ms). If the absence of other technologies cannot be guaranteed (same condition as in existing specs for other cases), X=5. Otherwise, X=10. Otherwise (if new HARQ feedback is not available), CW is to remain the same. Note that HARQ feedback includes any implicit methods of HARQ feedback determination.

Regarding HARQ feedback, according to a first option, one PUCCH may carry HARQ-ACK feedback for one or more PDSCH groups. DCI can request HARQ-ACK feedback for one or more PDSCH groups. In one embodiment, C-DAI/T-DAI can be accumulated across multiple PDSCH groups for which feedback is requested in the same PUCCH. In another embodiment, C-DAI/T-DAI is accumulated only within one PDSCH group. In certain embodiments, there is a new ACK-Feedback Group Indicator for each PDSCH Group. The number of HARQ-ACK bits for one PDSCH group is constant between a first HARQ-ACK feedback transmission and a HARQ-ACK feedback re-transmission, i.e., the PDSCH group cannot be enlarged after the first feedback transmission However, according to a second option, one PUCCH can carry HARQ-ACK feedback for a single PDSCH group. DCI can request HARQ-ACK feedback for a single PDSCH group. C-DAI/T-DAI is accumulated within one PDSCH group. A reset indicator signals new HARQ-ACK feedback for a PDSCH group. The number of HARQ-ACK bits for one PDSCH group may not be constant between a first HARQ-ACK feedback transmission and a HARQ-ACK feedback re-transmission.

If request/trigger for one-shot group HARQ ACK feedback for all configured HARQ processes is introduced (at least for non-CBG HARQ), select one or more of the following candidate schemes: A) The request is carried in a UE-specific DCI carrying a PUSCH grant; B) The request is carried in a UE-specific DCI carrying a PDSCH assignment; C) The request is carried in a UE-specific DCI not scheduling PDSCH nor PUSCH; D) The request is carried in a UE-common DCI; E) The request can be used for UE configured with dynamic or semi-static HARQ codebook. Thus, the network may support requesting feedback of a HARQ-ACK codebook containing all DL HARQ processes (one-shot feedback) for all CCs configured for a UE in the PUCCH group. One-shot feedback is to be configurable separately from the configuration of semi-static (including any potential enhancements)/non-enhanced dynamic HARQ codebook.

In some embodiments, if a UE is configured to monitor feedback request of a HARQ-ACK codebook containing all DL HARQ processes (one-shot feedback). In certain embodiments, the feedback can only be requested in a UE-specific DCI. In certain embodiments, feedback can be requested for reporting in PUCCH. Note that the HARQ feedback may be piggybacked on PUSCH.

To incorporate LBT into the channel access mechanism for both data channels and control channel, a contention window size ("CWS") adjustment update procedure for PUCCH and PUSCH and PDSCH considering directional LBT. In various embodiments, the channel access mechanism is omni-directional with Cat 4 LBT.

In some embodiments, the CWS adjustment is independently performed per Tx beam/panel (or Tx spatial filter, Tx spatial setting, Tx spatial relation, and/or TCI state) for the data channel. Here, determining the contention window size of the data channel (e.g., PUSCH/PDSCH/PSSCH) for the subsequent LBT/CCA procedure takes into account the Tx spatial setting of the data channel for which the HARQ-ACK feedback report was generated and does not depend on the spatial setting of the control channel transmitting the HARQ-ACK/NACK feedback reports.

In some embodiments, the UE may initiate to perform second LBT on a set of Tx panels/beams/spatial filter (indicated by gNB) in a time domain manner or simultaneously (parallel LBT) using second Tx beam/panel/spatial filter while UE has an ongoing UL transmission in the first beam/panel/spatial filter. In certain embodiments, the CWS adjustment procedure for each of the plurality of Tx beams/panels/spatial filters is done according to the highest priority CAPC that are currently used for LBT. Here, the generated TB may be transmitted in any of the Tx beams/panels/spatial filters whichever has the minimum CWS for transmission from the time TB is generated.

In certain embodiments, the CWS adjustment procedure for plurality of Tx beams/panels/spatial filters is done independently for each Tx beam/panel/spatial filter according to the CAPC value used when performing LBT. If UE uses the same TX beam/panel/spatial filter to transmit data belonging to first and second LBT, then the CWS adjustment procedure for the Tx beam/panel/spatial filter are done according to the highest priority CAPC.

Determining the contention window size adjustment of beam/panel/spatial filter for PUCCH transmission may be based on the PUCCH reception status at gNB. CWS of the corresponding beam/panel/spatial that transmitted PUCCH is increased to the next value or doubled when PUCCH decoding fails or DTX at gNB.

FIG. 1 depicts a wireless communication system 100 for adjusting a contention window size, according to embodiments of the disclosure. In one embodiment, the wireless communication system 100 includes at least one remote unit 105, a radio access network ("RAN") 120, and a mobile core network 130. The RAN 120 and the mobile core network 130 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 130 are depicted in FIG. 1, one of skill in the art will recognize that any number of remote units 105, base units 121, wireless communication links 123, RANs 120, and mobile core networks 130 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130. As described in greater detail below, the RAN 120 may send a measurement and reporting configuration 111 to the remote unit 105, wherein the remote unit 105 sends a measurement report 113 to the RAN 120.

In some embodiments, the remote units 105 communicate with an application server 141 via a network connection with the mobile core network 130. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server 141 in the packet data network 140 using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 140. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 130 is a 5GC or an Evolved Packet Core ("EPC"), which may be coupled to a packet data network 140, like the Internet and private data networks, among other data networks. A remote unit 105 may have a subscription or other account with the mobile core network 130. Each mobile core network 130 belongs to a single PLMN. The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 133 that serves the RAN 120, a Session Management Function ("SMF") 135, a Policy Control Function ("PCF") 137, and a Unified Data Management function ("UDM"). In some embodiments, the UDM is co-located with a User Data Repository ("UDR"), depicted as combined entity "UDM/UDR" 139. In various embodiments, the mobile core network 130 may also include an Authentication Server Function ("AUSF"), a Network Repository Function ("NRF") (used by the various NFs to discover and communicate with each other over Application Programming Interfaces ("APIs")), or other NFs defined for the 5GC. In certain embodiments, the mobile core network 130 may include an authentication, authorization, and accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. A network instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 135 and UPF 131. In some embodiments, the different network slices may share some common network functions, such as the AMF 133. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 130. Moreover, in an LTE variant where the mobile core network 130 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 133 may be mapped to an MME, the SMF 135 may be mapped to a control plane portion of a PGW and/or to an MME, the UPF 131 may be mapped to an SGW and a user plane portion of the PGW, the UDM/UDR 139 may be mapped to an HSS, etc.

While FIG. 1 depicts components of a 5G RAN and a 5G core network, the described embodiments for adjusting a contention window size apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the term "gNB" is used for the base station but it is replaceable by any other RAN node, e.g., eNB, Base Station ("BS"), Access Point ("AP"), etc. Further, the operations are described mainly in the context of 5G NR. However, the proposed solutions/methods are also equally applicable to other mobile communication systems.

Figure 2:
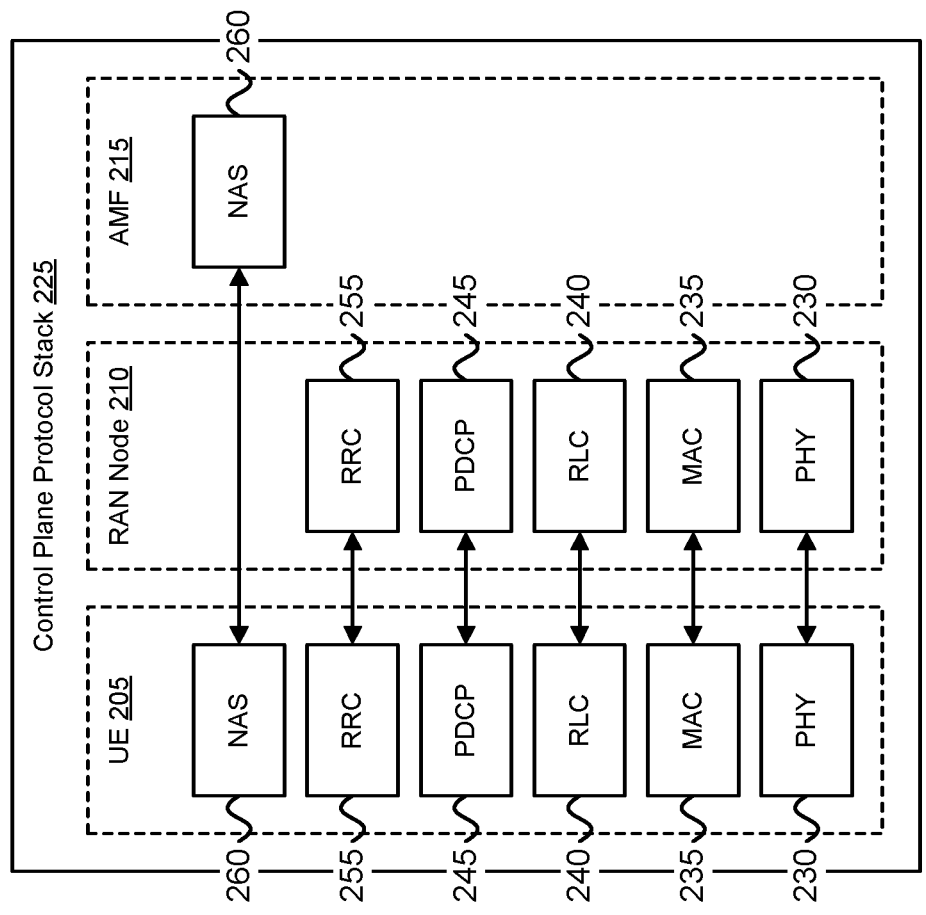
FIG. 2 is a block diagram illustrating one embodiment of a Fifth-Generation ("5G") New Radio ("NR") protocol stack.
Figure 2:
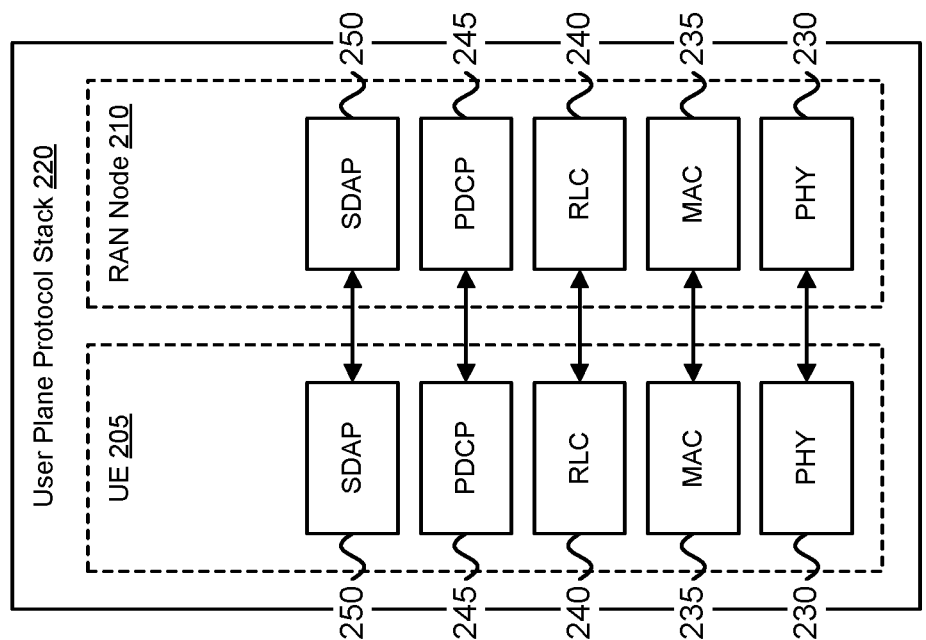

FIG. 2 depicts a NR protocol stack 200, according to embodiments of the disclosure. While FIG. 2 shows a UE 205, a gNB 210 and an AMF 215 in a 5G core network ("5GC"), these are representative of a set of remote units 105 interacting with a base unit 121 and NF in a mobile core network 140. As depicted, the protocol stack 200 comprises a User Plane protocol stack 220 and a Control Plane protocol stack 225. The User Plane protocol stack 220 includes a physical ("PHY") layer 230, a Medium Access Control ("MAC") sublayer 235, the Radio Link Control ("RLC") sublayer 240, a Packet Data Convergence Protocol ("PDCP") sublayer 245, and Service Data Adaptation Protocol ("SDAP") layer 250. The Control Plane protocol stack 225 includes a physical layer 230, a MAC sublayer 235, a RLC sublayer 240, and a PDCP sublayer 245. The Control Plane protocol stack 225 also includes a Radio Resource Control ("RRC") layer 255 and a Non-Access Stratum ("NAS") layer 260.

The AS layer (also referred to as "AS protocol stack") for the User Plane protocol stack 220 consists of at least SDAP, PDCP, RLC and MAC sublayers, and the physical layer. The AS layer for the Control Plane protocol stack 225 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 255 and the NAS layer 260 for the control plane and includes, e.g., an Internet Protocol ("IP") layer or PDU Layer (not depicted) for the user plane. L1 and L2 are referred to as "lower layers," while L3 and above (e.g., transport layer, application layer) are referred to as "higher layers" or "upper layers."

The physical layer 230 offers transport channels to the MAC sublayer 235. The physical layer 230 may perform CCA/LBT procedure as described herein. In certain embodiments, the physical layer 230 may send a notification of UL LBT failure to a MAC entity at the MAC sublayer 235. The MAC sublayer 235 offers logical channels to the RLC sublayer 240. The RLC sublayer 240 offers RLC channels to the PDCP sublayer 245. The PDCP sublayer 245 offers radio bearers to the SDAP sublayer 250 and/or RRC layer 255. The SDAP sublayer 250 offers QoS flows to the core network (e.g., 5GC). The RRC layer 255 provides for the addition, modification, and release of Carrier Aggregation and/or Dual Connectivity. The RRC layer 255 also manages the establishment, configuration, maintenance, and release of Signaling Radio Bearers ("SRBs") and Data Radio Bearers ("DRBs").

The NAS layer 260 is between the UE 205 and the 5GC 215. NAS messages are passed transparently through the RAN. The NAS layer 260 is used to manage the establishment of communication sessions and for maintaining continuous communications with the UE 205 as it moves between different cells of the RAN. In contrast, the AS layer is between the UE 205 and the RAN carries information over the wireless portion of the network.

Regarding channel access procedure, in NR-U several categories of LBT are defined: For Category-1 ("Cat-1") there is no LBT; For Category-2 ("Cat-2") there is LBT without random backoff; For Category-3 ("Cat-3") there is LBT with random backoff and fixed Contention Window Size ("CWS"); For Category-4 ("Cat-4") there is LBT with random backoff and variable CWS.

The contention window is increased exponentially with the occurrence of collisions and is reset to the minimum value once the transmission succeeds. Given the random nature of the back off procedure, different devices will have different back off intervals, improving channel adaptation. If the most recent downlink transmission burst showed 80% or more decoding errors, as reported via HARQ feedback (NACKs) from UEs 205, then the CW is doubled for the next LBT.

When performing Listen-Before-Talk ("LBT"), a device backs off for a certain number of idle slots. As discussed further below, the channel is deemed to be idle if it remains so for a defer duration (Td). To reduce the possibility of a collision, devices need to back off for different amounts of idle slots. Upon successful LBT, the device initiates channel occupancy and is permitted to access the channel for a specific duration, referred to as Channel Occupancy Time ("COT").

A UE 205 may access a channel on which UL one or more transmissions are to be performed according to Type 1 channel access or Type 2 channel access. In various embodiments, a precondition to channel access is that the UE 205 receives a UL grant scheduling a set of time/frequency resources, i.e., one or more resource blocks. Resources in the time-domain may be referred to as symbols, timeslots, slots, subframes, frames, etc. Resources in the frequency domain may be referred to a subcarrier. A grouping of subcarriers over one time unit may be referred to as a resource block.

In one embodiment, a (dynamic) UL grant scheduling a PUSCH transmission may indicate Type 1 channel access procedures. In another embodiment, a (dynamic) UL grant scheduling a PUSCH transmission may indicate Type 2 channel access procedures. The UE 205 may use Type 1 channel access procedures for transmitting autonomous or configured grant PUSCH transmissions using configured UL resources. The UE 205 may also use Type 1 channel access procedures for transmitting PUCCH and/or for SRS transmissions that do not include PUSCH (i.e., data) transmissions.

A UE 205 may transmit the transmission using Type 1 channel access procedure after first sensing the channel to be idle during the slot durations of a defer duration $T_d$, and after the counter N is zero in step 4. Here, it is assumed the time duration spanned by the sensing slots that are sensed to be idle before a UL transmission(s) is random. The counter N is adjusted by sensing the channel for additional slot duration(s) according to the steps described below.

1) set $N=N_{init}$, where $N_{init}$ is a random number uniformly distributed between 0 and $CW_P$, and go to step 4;
2) if N>0 and the UE 205 chooses to decrement the counter, set N=N−1;
3) sense the channel for an additional slot duration, and if the additional slot duration is idle, go to step 4; else, go to step 5;
4) if N=0, stop; else, go to step 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5;

If a UE 205 has not transmitted a UL transmission on a channel on which UL transmission(s) are performed after step 4 in the procedure above, the UE 205 may transmit a transmission on the channel, if the channel is sensed to be idle at least in a sensing slot duration $T_{sl}$ when the UE 205 is ready to transmit the transmission and if the channel has been sensed to be idle during all the slot durations of a defer duration $T_d$ immediately before the transmission. If the channel has not been sensed to be idle in a sensing slot duration $T_{sl}$ when the UE 205 first senses the channel after it is ready to transmit, or if the channel has not been sensed to be idle during any of the sensing slot durations of a defer duration $T_d$ immediately before the intended transmission, the UE 205 proceeds to step 1 after sensing the channel to be idle during the slot durations of a defer duration $T_d$.

The defer duration $T_d$ consists of duration $T_f=16$ us immediately followed by $m_p$ consecutive slot durations where each slot duration is $T_{sl}=9$ us, and $T_f$ includes an idle slot duration $T_{sl}$ at start of $T_f$.

$CW_{min,p} \leq CW_p \leq CW_{max,p}$ is the contention window. $CW_p$ adjustment is described below. Note that $CW_{min,p}$ and $CW_{max,p}$ are chosen before step 1 of the procedure above. Also note that $CW_{min,p}$ and $CW_{max,p}$ are based on a channel access priority class p, e.g., that is signaled to the UE 205.

If a UE 205 transmits transmissions using Type 1 channel access procedures that are associated with channel access priority class p on a channel, the UE 205 maintains the contention window value $CW_p$ and adjusts $CW_p$ for those transmissions before step 1 of the procedure described in clause 4.2.1.1, using the following steps:

1) For every priority class $p \in \{1,2,3,4\}$, set $CW_p = CW_{min,p}$;
2) If HARQ-ACK feedback is available after the last update of $CW_p$, go to step 3. Otherwise, if the UE 205 transmission after procedure described in clause 4.2.1.1 does not include a retransmission or is transmitted within a duration $T_w$ from the end of the reference duration corresponding to the earliest UL transmission burst after the last update of $CW_p$ transmitted after the procedures described in clause 4.1.1, go to step 5; otherwise go to step 4.
3) The HARQ-ACK feedback(s) corresponding to PUSCH(s) in the reference duration for the latest UL transmission burst for which HARQ-ACK feedback is available is used as follows:
   a. If at least one HARQ-ACK feedback is 'ACK' for PUSCH(s) with transport block (TB) based transmissions or at least 10% of HARQ-ACK feedbacks is 'ACK' for PUSCH(s) with code block group (CBG) based transmissions go to step 1; otherwise go to step 4.
4) Increase $CW_p$ for every priority class $p \in \{1,2,3,4\}$ to the next higher allowed value;
5) For every priority class $p \in \{1,2,3,4\}$, maintain $CW_p$ as it is; go to step 2.

The HARQ-ACK feedback, reference duration and duration $T_w$ in the procedure above are defined as the following:

HARQ-ACK feedback for PUSCH(s) transmissions are expected to be provided to UE(s) 205 explicitly or implicitly where implicit HARQ-ACK feedback for the purpose of contention window adjustment in this clause, is determined based on the indication for a new transmission or retransmission in the DCI scheduling PUSCH(s) as follows:

If a new transmission is indicated, 'ACK' is assumed for the transport blocks or code block groups in the corresponding PUSCH(s) for the TB-based and CBG-based transmission, respectively.

If a retransmission is indicated for TB-based transmissions, 'NACK' is assumed for the transport blocks in the corresponding PUSCH(s).

If a retransmission is indicated for CBG-based transmissions, if a bit value in the code block group transmission information (CBGTI) field is '0' or '1', 'ACK' or NACK' is assumed for the corresponding CBG in the corresponding PUSCH(s), respectively.

The reference duration corresponding to a channel occupancy initiated by the UE 205 including transmission of PUSCH(s) is defined in this clause as a duration starting from the beginning of the channel occupancy until the end of the first slot where at least one unicast PUSCH is transmitted over all the resources allocated for the PUSCH, or until the end of the first transmission burst by the UE 205 that contains unicast PUSCH(s) transmitted over all the resources allocated for the PUSCH, whichever occurs earlier. If the channel occupancy includes a unicast PUSCH, but it does not include any unicast PUSCH transmitted over all the resources allocated for that PUSCH, then, the duration of the first transmission burst by the UE 205 within the channel occupancy that contains PUSCH(s) is the reference duration for CWS adjustment.

$T_w = \max(T_A, T_B+1 \text{ ms})$ where $T_B$ is the duration of the transmission burst from start of the reference duration in ms and $T_A=5$ ms if the absence of any other technology sharing the channel cannot be guaranteed on a long-term basis (e.g., by level of regulation), and $T_A=10$ ms otherwise.

If a UE 205 transmits transmissions using Type 1 channel access procedures associated with the channel access priority class p on a channel and the transmissions are not associated with explicit or implicit HARQ-ACK feedbacks as described above in this clause, the UE 205 adjusts $CW_P$ before step 1 in the procedures described in clause 4.2.1.1, using the latest $CW_P$ used for any UL transmissions on the channel using Type 1 channel access procedures associated with the channel access priority class p. If the corresponding channel access priority class p has not been for any UL transmission on the channel, $CW_p = CW_{min,p}$ is used.

As used herein, a spatial setting for a PUCCH transmission is provided by the Layer-1 ("L1") parameter PUCCH-SpatialRelationInfo if the UE 205 is configured with a single value for pucch-SpatialRelationInfold; otherwise, if the UE 205 is provided multiple values for PUCCH-SpatialRelationInfo, the UE 205 determines a spatial setting for the PUCCH transmission. One example mechanism for determining the spatial setting is described in 3GPP TS 38.321. The UE 205 applies a corresponding setting for a spatial domain filter to transmit PUCCH in the first slot that is after slot $k+3 \cdot N_{slot}^{subframe,\mu}$, where k is the slot where the UE 205 would transmit a PUCCH with HARQ-ACK information with ACK value corresponding to a PDSCH reception providing the information element ("IE") PUCCH-SpatialRelationInfo and $\mu$ is the SCS configuration for the PUCCH.

If PUCCH-SpatialRelationInfo provides parameter ssb-Index, then the UE 205 transmits the PUCCH using a same spatial domain filter as for a reception of a SS/PBCH block with index provided by ssb-Index for a same serving cell or, if parameter servingCellId is provided, for a serving cell indicated by servingCellId. Else, if PUCCH-SpatialRelationInfo provides parameter csi-RS-Index, the UE 205 transmits the PUCCH using a same spatial domain filter as for a reception of a CSI-RS with resource index provided by csi-RS-Index for a same serving cell or, if servingCellId is provided, for a serving cell indicated by servingCellId. Else, if PUCCH-SpatialRelationInfo provides parameter srs, the UE 205 transmits the PUCCH using a same spatial domain filter as for a transmission of a Sounding Reference Signal ("SRS") with resource index provided by resource for a same serving cell and/or active UL BWP or, if parameter(s) servingCellId and/or uplinkBWP are provided, for a serving cell indicated by servingCellId and/or for an UL bandwidth part ("BWP") indicated by uplinkBWP.

If a UE 205 (*a*) reports beamCorrespondenceWithoutUL-BeamSweeping, and (b) is not provided parameter pathloss-ReferenceRSs in IE PUCCH-PowerControl, and (c) is provided enableDefaultBeamPlForPUCCH, and (d) is not provided PUCCH-SpatialRelationInfo, then a spatial setting for a PUCCH transmission from the UE 205 is same as a spatial setting for PDCCH receptions by the UE 205 in the CORESET with the lowest ID on the active DL BWP of the primary cell ("PCell").

According to embodiments of the first solution, contention window size adjustment for a channel access priority class ("CAPC") of a data and/or control channel depends on (i.e., is based on) the Tx beam/panel (alternatively, on the Tx spatial filter, the Tx spatial setting, the Tx spatial relation, and/or the TCI state) for which HARQ reporting was generated. In one example, a CWS is maintained/adjusted for each TX beam/spatial (alternatively, the TX spatial filter/spatial setting/spatial relation/TCI state) associated with the data/control channel transmission that initiated the Channel occupancy using cat 4 LBT. In the following, it is assumed that the CWS adjustment is independently performed per TX panel/beam/spatial filter/spatial setting/spatial relation/TCI state.

In the first solution, the determination of CWS adjustment for a TX beam/panel (alternatively, the TX spatial filter) of a data channel (or associated with a spatial setting, spatial relation, and/or TCI state for the data channel transmission) for any subsequent LBT can be based on the HARQ feedback (i.e., HARQ-ACK/NACKs) received for the data channel Note that the determination of CWS adjustment depends on the TX spatial filter/spatial setting/spatial relation/TCI state of the corresponding data channel for which the HARQ-ACK report was generated. Importantly, the determination of CWS adjustment does not depend on the RX beam/panel, the Rx spatial filter, the Rx spatial setting, the Rx spatial relation, or the TCI state of the control channel on which the HARQ-ACK/NACK feedback report is received. The data channels may be any of Physical Downlink Shared Channel ("PDCCH"), Physical Uplink Shared Channel ("PUCCH"), and Physical Sidelink Shared Channel ("PSSCH"). The relationship between the sensing beam that initiated COT using cat 4 LBT and the transmit beam is defined using QCL-type D assumption. The sensing beam that initiated the COT using the cat 4 LBT may cover one or more transmit beam used for transmission in a COT where CWS adjustment is applied for a beam that initiated the COT.

According to a first implementation of the first solution, at a gNB 210 the CWS adjustment of the TX beam/panel (alternatively, on the Tx spatial filter, the Tx spatial setting, the Tx spatial relation, and/or the TCI state of PDSCH) depends on (1) the HARQ-ACK/NACK feedback and (2) the channel access priority class ("CAPC") associated with PDSCH. Note that the determination of CWS adjustment depends on the TX beam/panel (or spatial filter, or spatial setting, or spatial relation, or TCI state of PDSCH) for which the HARQ-ACK/NACK feedback report was generated. Here, CWS adjustment does not depend on the RX beam/panel (or spatial filter, or spatial setting, or spatial relation, or TCI state) that received the PUCCH or UCI over PUSCH carrying the HARQ-ACK/NACK feedback reports.

Using the HARQ-ACK/NACK feedback reports, the gNB 210 determines a CWS adjustment for the TX beam/panel (alternatively: spatial filter, spatial setting, spatial relation, and/or TCI state) that transmitted the PDSCH to which the HARQ-ACK/NACK feedback pertains. In one embodiment, if ACK is detected (e.g., corresponding to PDSCH(s) in a reference duration for the latest DL transmission burst), then the gNB 210 sets the CWS for the TX beam/panel to a minimum value for the CAPC (denoted 'CWmin'). Otherwise, (e.g., if NACK is detected corresponding to PDSCH(s) in the reference duration), then the gNB 210 increases the CWS for the TX beam/panel to the next allowed value in the priority class. If HARQ-ACK report is not generated or transmitted within the reference duration, then the CWS value remain same.

In one embodiment, the next allowed value is determined using the minimum function: $\min((CW \times 2), CW_{max})$. Here, CW represents the current size of the contention window and CWmax represents a maximum allowed CWS. Note that the values of CWmin and CWmax may be defined based on the CAPC associated with the PDSCH transmission.

According to a second implementation of the first solution, at a UE 205 the CWS adjustment of the TX beam/panel (alternatively, on the Tx spatial filter, the Tx spatial setting, the Tx spatial relation, and/or the TCI state of PUSCH) depends on (1) the HARQ-ACK/NACK feedback and (2) the CAPC associated with PUSCH. Note that the determination of CWS adjustment depends on the TX beam/panel (or spatial filter, or spatial setting, or spatial relation, or TCI state of PUSCH) for which the HARQ-ACK/NACK report was generated and does not depend on the RX beam/panel (or spatial filter, or spatial setting, or spatial relation, or TCI state) receiving the HARQ feedback.

Using the New Data Indicator ("NDI") of the corresponding HARQ Process ID or downlink feedback information ("DFI"), the UE 205 determines a CWS adjustment for the TX beam/panel (alternatively: spatial filter, spatial setting, spatial relation, and/or TCI state) that transmitted the PUSCH to which the NDI pertains. Note that a toggled NDI for a HARQ process (as compared to its last state) indicates that a corresponding uplink grant is for new data (new transmission), thus implicitly signaling that the previous data transmission (i.e., PUSCH) corresponding to the HARQ process ID or DFI was successfully received (and decoded). In contrast, an untoggled NDI for the HARQ process (as compared to its last state) indicates that a corresponding uplink grant is for the same data (re-transmission), thus implicitly signaling that the previous data transmission (i.e., PUSCH) corresponding to the HARQ process ID or DFI was unsuccessfully received and/or decoded.

In one embodiment, if toggled NDI or ACK is detected (e.g., corresponding to PUSCH(s) in a reference duration for the latest UL transmission burst), then the UE 205 sets the CWS for the TX beam/panel to a minimum value for the CAPC (denoted 'CWmin'). Otherwise, (e.g., if untoggled NDI or NACK is detected corresponding to PUSCH(s) in the reference duration), then the UE 205 increases the CWS for the TX beam/panel to the next allowed value in the priority class.

As described above, the next allowed value may be determined using the minimum function: $\min((CW \times 2), CW_{max})$. Here, CW represents the current size of the contention window and CWmax represents a maximum allowed CWS. Note that the values of CWmin and CWmax may be defined based on the CAPC associated with the PDSCH transmission.

According to a third implementation of the first solution, at a UE 205 the CWS adjustment of the TX beam/panel (alternatively, of the Tx spatial filter, the Tx spatial setting, the Tx spatial relation, and/or the TCI state of PUSCH) depends on (1) whether the (directional) PUSCH transmission was successfully received (and decoded) and (2) the CAPC associated with PUSCH. Note that the determination of CWS adjustment depends on the TX beam/panel (or spatial filter, or spatial setting, or spatial relation, or TCI state of PUSCH) for which the HARQ-ACK/NACK report was generated. Again, the determination of CWS adjustment does not depend on the RX beam/panel (or spatial filter, or spatial setting, or spatial relation, or TCI state) receiving the HARQ feedback.

In the third implementation, the PUSCH transmission may be a Configured Grant ("CG") transmission (e.g., a non-dynamic, semi-persistent allocation of UL resources allowing a grant-free UL transmission, i.e., transmission without grant). The HARQ structure of CG transmissions may be timer-based. Here, the UE 205 starts a CG re-transmission timer (e.g., cg-RetransmissionTimer) for a HARQ process ID upon making a CG transmission (i.e., where no LBT failure indication is received). If the HARQ process receives DFI (e.g., ACK or NACK), then the UE 205 stops the CG re-transmission timer. Note that the UE 205 may adjust the CWS based on DFI as described above.

However, upon expiry of the CG re-transmission timer for HARQ process ID, the UE 205 considers the CG transmission to be unsuccessful and increases the CWS for the Tx beam/panel/spatial filter/spatial setting/spatial relation/TCI state associated with the corresponding PUSCH, i.e., to the next allowed value. In one embodiment, the next allowed value is determined using the minimum function: $\min((CW \times 2), CW_{max})$. Again, CW represents the current size of the contention window and CWmax represents a maximum allowed CWS. CWS is set to CWmin, if UE receives ACK before the expiry of the timer.

According to a fourth implementation of the first solution, at a transmitting sidelink UE 205 ("TX UE") the CWS adjustment of the Tx beam/panel (alternatively, of the Tx spatial filter, the TX spatial setting, the Tx spatial relation, and/or the TCI state of PSSCH) depends on (1) the HARQ feedback and (2) the CAPC associated with the PSSCH transmission. Again, the determination of CWS adjustment depends on the TX beam/panel (or spatial filter, or spatial setting, or spatial relation, or TCI state of PSSCH) for which the HARQ-ACK/NACK report was generated and does not depend on the RX beam/panel (or spatial filter, or spatial setting, or spatial relation, or TCI state of PFSCH) receiving the HARQ feedback.

In some embodiments, the receiving sidelink UEs 205 ("RX UEs") are configured with common NACK-only resources, referred to as (sidelink) HARQ Option 1. In other embodiments, the RX UEs are configured with dedicated ACK/NACK resources, referred to as (sidelink) HARQ Option 2.

Using the PSFCH reception (i.e., NACK(s) based on HARQ Option 1, ACK(s)/NACK(s) based on HARQ Option 2) for the corresponding source-destination ID or HARQ processes, the TX UE determines a CWS adjustment for the TX beam/panel (alternatively: spatial filter, spatial setting, spatial relation, and/or TCI state) that transmitted the PSSCH to which the PSFCH pertains. If ACK is detected (e.g., corresponding to PSSCH(s) in a reference duration for the latest SL transmission burst), then the TX UE sets the CWS for the TX beam/panel to CWmin. Note that for HARQ Option 1, if no NACK is received, then the TX UE considers that the PSSCH was successfully received and thus set the CWS to CWmin.

Otherwise, if NACK is detected corresponding to PSSCH(s) in the reference duration, the TX UE increases the CWS for the Tx beam/panel (or spatial filter, or spatial setting, or spatial relation, or TCI state of PSSCH) to the next allowed value. In one embodiment, the next allowed value is determined using the minimum function: $\min((CW \times 2), CW_{max})$, where CW represents the current size of the contention window and CWmax represents a maximum allowed CWS.

According to a fifth implementation of the first solution, the above values of $m_p$, CWmin and CWmax for the Tx beam/panel (or spatial filter, or spatial setting, or spatial relation, or TCI state of the data channel) depend on a CAPC associated with the data transmission (e.g., PUSCH, PDSCH or PSSCH). In one embodiment, the next allowed value is determined using the minimum function: $\min((CW \times 2), CW_{max})$, where CW represents the current size of the contention window and CWmax represents a maximum allowed CWS according to the CAPC. Table 1, below, gives exemplary values of CWmin and CWmax for a set of Channel Access Priority Classes.

TABLE 1

| Link Direction | Channel Access Priority Class p | $m_p$ | CWmin, p | CWmax, p | Allowed CWp sizes |
|---|---|---|---|---|---|
| Downlink | 1 | 1 | 3 | 7 | [3, 7] |
| | 2 | 1 | 7 | 15 | [7, 15] |
| | 3 | 3 | 15 | 63 | [15, 31, 63] |
| | 4 | 7 | 15 | 1023 | [15, 31, 63, 127, 255, 511, 1023] |
| Uplink | 1 | 2 | 3 | 7 | [3, 7] |
| | 2 | 2 | 7 | 15 | [7, 15] |
| | 3 | 3 | 15 | 1023 | [15, 31, 63, 127, 255, 511, 1023] |
| | 4 | 7 | 15 | 1023 | [15, 31, 63, 127, 255, 511, 1023] |

According to a sixth implementation of the first solution, the above described principles for CWS adjustment of a PUSCH transmission also may be applied to UCI over PUSCH (or PUSCH-only transmissions without UL-SCH) although PUSCH is taken as an example, but in general the same procedure also applies for control information sent on PUSCH, such as UCI over PUSCH or PUSCH/UCI without UL-SCH data. As described above, the CWS adjustment of the TX beam/panel (alternatively, on the Tx spatial filter, the Tx spatial setting, the Tx spatial relation, and/or the TCI state of PUSCH) depends on the HARQ-ACK/NACK feedback for the PUSCH transmission and does not depend on the RX beam/panel (or spatial filter, or spatial setting, or spatial relation, or TCI state of PDCCH) receiving the HARQ feedback.

According to a seventh implementation of the first solution, a CW reset procedure in a reference duration is applied for a TX beam/panel, alternatively, on the Tx spatial filter, the Tx spatial setting, the Tx spatial relation, and/or the TCI state of a data channel or control channel. The CW reset procedure is described using the below rule.

If $CW_p=CW_{max,p}$ then the next higher allowed value for adjusting $CW_p$ is $CW_{max,p}$. The number of times is $CW_p=CW_{max,p}$ is used tracked, and if $CW_p=CW_{max,p}$ is consecutively used K times for generation of $N_{init}$, then $CW_p$ is reset to $CW_{min,p}$ only for that priority class p for which $CW_p=CW_{max,p}$ is consecutively used K times for generation of $N_{init}$. In various embodiments, the value of K is selected by the UE 205 from the set of values {1, 2, . . . , 8} for each priority class p∈{1,2,3,4}.

According to an eighth implementation of the first solution, the CWS adjustment procedure includes setting the CWS to CWmin for a CAPC p in a reference duration for a TX beam/panel—alternatively, on the Tx spatial filter, the Tx spatial setting, the Tx spatial relation, and/or the TCI state of a data channel or control channel—when at least one HARQ feedback is reported as ACK. As described above, the ACK indication may be received in PUCCH, in UCI over PUSCH, or in PSFCH. Alternatively, the ACK indication may be a toggled NDI that is received in DCI, or SCI, or PDSCH is decoded correctly, or PUSCH decoded correctly, or PSSCH decoded properly.

According to embodiments of the second solution, the UE 205 initiates a second LBT procedure using a second TX beam/panel (alternatively, on the Tx spatial filter, the Tx spatial setting, the Tx spatial relation, and/or the TCI state) while the UE 205 has an ongoing UL transmission using the first TX beam/panel (alternatively, on the Tx spatial filter, the Tx spatial setting, the Tx spatial relation, and/or the TCI state). Note that the second LBT procedure may have a different channel access priority class (and thus different CWS value) to transmit data once LBT is successful.

In the second solution, the UE 205 may initiate one or more second LBT procedures on a set of TX beam/panel—alternatively, on the Tx spatial filter, the Tx spatial setting, the Tx spatial relation, and/or the TCI state of PUSCH—(e.g., where the set is indicated by gNB 210). Here, multiple second LBT procedures may be performed in a time sequential manner, also referred to as Time Division Multiplexing ("TDM") manner. Alternatively, the multiple second LBT procedures may be performed simultaneously, also referred to as in parallel manner. As described above, the one or more second LBT procedures are performed using one or more second Tx beam/panel—alternatively, on the Tx spatial filter, the Tx spatial setting, the Tx spatial relation, and/or the TCI state—while the UE 205 has an ongoing UL transmission using the first beam/panel (or Tx spatial filter, Tx spatial setting, Tx spatial relation, and/or TCI state).

According to a first implementation of the second solution, the CWS adjustment of each of the first and second TX beams/panels (alternatively, on the Tx spatial filters, the Tx spatial settings, the Tx spatial relations, and/or the TCI states) are done independently for each beam/panel (or Tx spatial filter, Tx spatial setting, Tx spatial relation, and/or TCI state) according to the CAPC value used when performing the corresponding LBT or received in the corresponding UL grant.

In certain embodiments, a generated TB may be transmitted in any of the first or second Tx beams/panels (or Tx spatial filters, Tx spatial settings, Tx spatial relations, and/or TCI states), whichever Tx beam/panel has the minimum CWS for transmission at the time that the LBT procedure (i.e., clear channel assessment) is started.

In certain embodiments, the UE 205 may prioritize channel access procedure for UL transmission(s) associated with TX beams/panels (alternatively, on Tx spatial filters, Tx spatial settings, Tx spatial relations, and/or Tx states) in order of their corresponding CWS. For example, the UE 205 may order the TX beams/panels in ascending order starting from the TX beam/panel which currently has the smallest CWS. More particularly, the UE 205 may prioritize channel access procedure in order of CWS where the UE 205 is not able to perform LBT in parallel for the different beam/panel (or Tx spatial filter, Tx spatial setting, Tx spatial relation, and/or TCI state). In such embodiments, the UE 205 may perform UL transmission(s) (e.g., transmit the generated TB) using whichever TX beam/panel (or Tx spatial filter, Tx spatial setting, Tx spatial relation, and/or TCI state) is associated with the earliest channel access procedure/LBT that is successful.

According to a second implementation of the second solution, the CWS adjustment procedure for a plurality of Tx beams/TX beam/panel (alternatively, a plurality of Tx spatial filters, Tx spatial settings, Tx spatial relations, and/or TCI states) is done independently for each Tx beam/panel (or Tx spatial filter, Tx spatial setting, Tx spatial relation, and/or TCI state) according to the CAPC value used when performing LBT.

According to a third implementation of the second solution, for the case where a UE 205 does not support multiple simultaneous LBT procedure at the same time period using a single (same) TX beam/panel (or Tx spatial filter, Tx spatial setting, Tx spatial relation, and/or TCI state) or using a plurality of TX beam/panel (or Tx spatial filter, Tx spatial setting, Tx spatial relation, and/or TCI state for the first and second LBT, then the UE 205 may stop the first LBT procedure to start the second LBT procedure based on the priority of the generate TB, i.e., based on a TB priority derived from the LCH(s) or based on the priority of the CAPC. In one example, the UE 205 could skip the UL grant when it decides to stop the first LBT procedure to start the second LBT procedure.

According to embodiment of a third solution, the Contention Window Size may be adjusted for a directional transmissions for a control channel, such as PUCCH. Here, determination of the contention window size adjustment for Tx beam/panel—alternatively, on the Tx spatial filter, the Tx spatial setting, the Tx spatial relation, and/or the TCI state of PUCCH transmission—may be based on the channel access priority class of PUCCH (Pi) and/or on the PUCCH reception status at gNB 210. In the third embodiment, it is assumed that CWS adjustment of PUCCH is independently performed per panel/beam. In some embodiments, the reception failure of PUCCH is based on the loss of aggregated/bundled HARQ feedback reports.

In various embodiments, the UE 205 performs LBT on a set of panel—alternatively, on the Tx spatial filter, the Tx spatial setting, the Tx spatial relation, and/or the TCI state—(e.g., where the set indicated by gNB 210) either in a time sequential manner (i.e., TDM manner) or simultaneously (i.e., parallel LBT). The UE 205 transmits PUCCH in one or more TX panels/beams/spatial filters once LBT is successful.

In some embodiments, multiple Tx spatial filters may be configured/activated for PUCCH transmission of a UE 205 using MAC CE or any other L1/L2 signaling. In certain embodiments, each of the spatial filter for PUCCH transmission may be different for e.g., SSB, CSI-RS, PDCCH/CORESET etc. In various embodiments, the UE 205 may use the same spatial filter configuration for each of the beams/panels to transmit PUCCH. Here, the UE 205 can be configured with the same or different PUCCH resources per Tx beam/panel—alternatively, on the Tx spatial filter, the Tx spatial setting, the Tx spatial relation, and/or the TCI state of PUCCH.

According to a first implementation of the third solution, the UE 205 detects aggregated ACK-to-NACK (and/or ACK-to-DTX) errors and NACK-to-ACK (and/or NACK-to-DTX) errors by monitoring the NDI field in DCI for corresponding HARQ-process IDs associated with the HARQ reports transmitted in PUCCH (or in UCI over PUSCH).

In various embodiments, the UE 205 transmits HARQ feedback report in PUCCH using a Tx beam/panel (or Tx spatial filter, Tx spatial setting, Tx spatial relation, and/or TCI state) where LBT/CCA is successful. In one case, PUCCH decoding can be successful at gNB 210 and in another case, PUCCH decoding failure or DTX can also happen at gNB 210. The gNB 210 transmits un-toggled NDI (i.e., indicating re-transmission) and/or toggled NDI (i.e., indicating new transmission) for the corresponding HARQ processes based on the interpretation of gNB 210 from the decoded HARQ reports (e.g., whether the HARQ report was (A) not received and/or erroneous decoded or (B) correctly decoded, respectively).

In the first implementation of the third solution, the NDIs of the corresponding HARQ processes (e.g., counter of number of NDI toggles for the HARQ processes) from subsequent DCI receptions are accumulated until the next PUCCH occasion for the same beam/panel (or Tx spatial filter, Tx spatial setting, Tx spatial relation, and/or TCI state) used for transmission of the PUCCH with the HARQ reports and compared against the corresponding HARQ reports (e.g., counter of number of ACKs tin the HARQ reports) transmitted in PUCCH. A direct comparison between received NDIs and transmitted HARQ feedback report for the corresponding HARQ processes determines the decoding status of PUCCH and if there are errors and these errors are compared against a certain configured threshold to determine the CWS adjustment.

- If the UE 205 detects these errors below the configured threshold, then the CWS for the Tx beam/panel (or Tx spatial filter, Tx spatial setting, Tx spatial relation, and/or TCI state) CWS is set to $CW_{min}$
- If the UE 205 detects these errors above the threshold then the CWS of the corresponding Tx beam/panel (alternatively, the corresponding spatial filter/spatial setting/spatial relation/TCI state), then the UE 205 increases the CWS to the next allowed value in the priority class or to the value $CW_{next}=\min((CW_{current} \times 2), CW_{max})$.
- If the UE 205 detect during the ongoing reference duration that one of the received feedback is above the error threshold or receives toggled NDI for the Ack feedback for a HARQ process it sent earlier then the CWS is reset.
- If the UE 205 does not transmit feedback during the reference duration, then the CWS is kept same.

According to a second implementation of the third solution, the UE 205 may monitor DAI value in the DCI in the subsequent reception and determine the reception status of PUCCH by comparing the DAI values from the subsequent DCI reception (e.g., DCI-2 format) against the previous transmission of HARQ reports in PUCCH.

Figure 3:
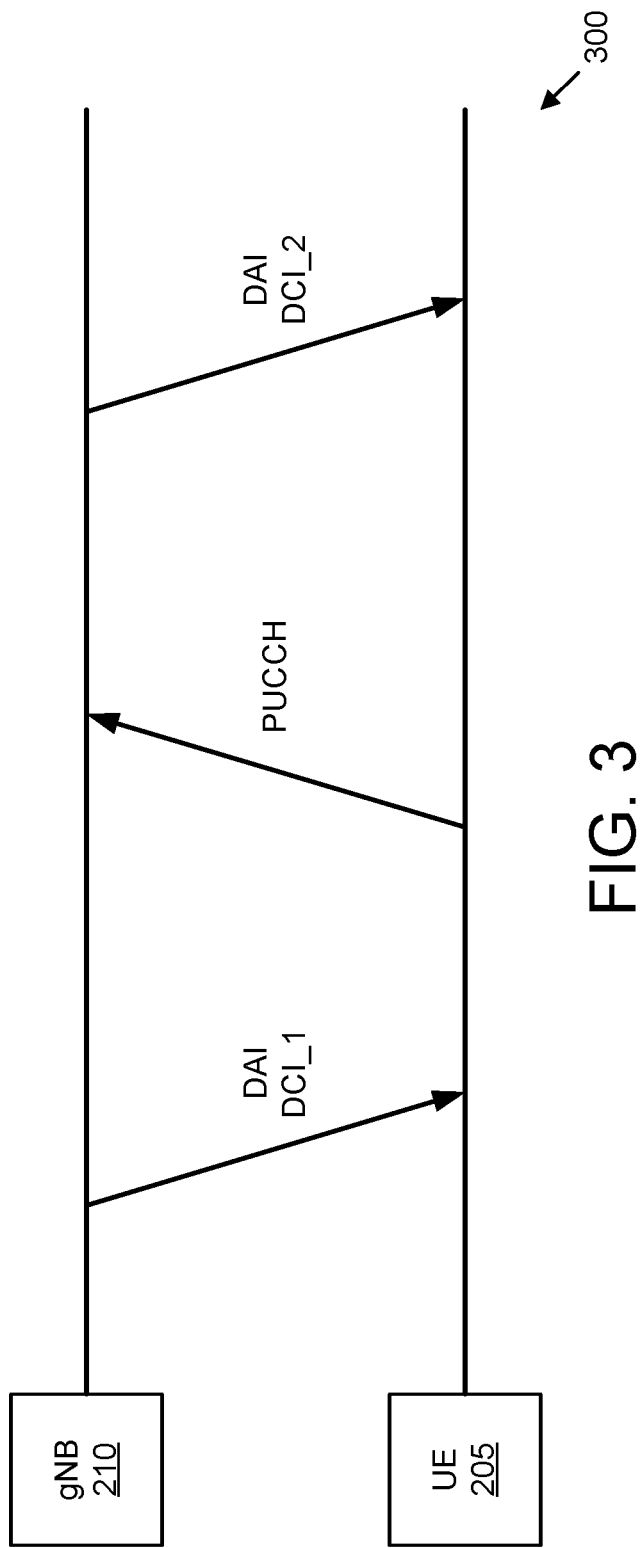
FIG. 3 is a diagram illustrating one embodiment of determining the reception status of Physical Uplink Control Channel ("PUCCH")

FIG. 3 is a diagram illustrating one embodiment of a UE 205 determining the reception status of PUCCH, according to the second implementation of the third solution. By comparing the DAI values from the subsequent DCI 2 reception against the previous transmission of HARQ reports in PUCCH, as shown, the UE 205 determines the reception status of PUCCH.

According to a third implementation of the third solution, the gNB 210 may determine the reception status of PUCCH by comparing the decoding status of HARQ feedbacks from the PUCCH and DAI value signaled in the previous DCI. The gNB 210 then transmits an explicit indication to the UE 205. In certain embodiments, a code point in the DCI (or MAC CE) is used to explicitly inform the UE 205 about the CWS adjustment for the Tx beam/panel, alternatively, the Tx spatial filter, Tx spatial setting, Tx spatial relation, and/or TCI state of PUCCH. In a first example, the code point may be interpreted as below:

- Bit value '00' indicates that the CWS is to be set to $CW_{min}$ corresponding to each priority class $p \in \{1,2,3,4\}$)
- Bit value '01' indicates that the CWS is to be incremented to the next allowed value in the priority class, e.g., using the minimum function: $CW_{next}=\min((CW_{current} \times 2), CW_{max})$
- Bit value '10' indicates that the CWS is to be reset ($CW_p$ is reset to $CW_{min,p}$ only for that priority class p for which $CW_p=CW_{max,p}$ is consecutively used K times for generation of $N_{init}$. Note that K is selected by eNB/gNB from the set of values $\{1, 2, \ldots, 8\}$ for each priority class $p \in \{1,2,3,4\}$)
- Bit value '11' indicates that the CWS is to remain the same value (i.e., the CWS does not change)—for the case where UE does not generate HARQ-ACK report or does not transmit HARQ feedback, CWS remains same In some embodiments, the terms antenna, panel, and antenna panel are used interchangeably. An antenna panel may be a hardware that is used for transmitting and/or receiving radio signals at frequencies lower than 6 GHz, e.g., frequency range 1 ("FR1", i.e., frequencies from 410 MHz to 7125 MHz), or higher than 6 GHz, e.g., FR2, or millimeter wave (mmWave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device (e.g., UE 205 or gNB 210) antenna panel may be a physical or logical antenna array comprising a set of antenna elements or antenna ports that share a common or a significant portion of an RF chain (e.g., in-phase/quadrature ("I/Q") modulator, analog to digital ("A/D") converter, local oscillator, phase shift network). The device antenna panel or "device panel" may be a logical entity with physical device antennas mapped to the logical entity. The mapping of physical device antennas to the logical entity may be up to device implementation.

Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" of a UE 205 may be transparent to the gNB 210. For certain condition(s), the gNB 210 or network can assume the mapping between device's physical antennas to the logical entity "device panel" may not be changed. For example, the condition may include until the next update or report from device or comprise a duration of time over which the gNB 210 assumes there will be no change to the mapping. A Device may report its capability with respect to the "device panel" to the gNB 210 or network. The device capability may include at least the number of "device panels." In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed.

Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. For example, qcl-Type may take one of the following values:
 'QCL-TypeA': {Doppler shift, Doppler spread, average delay, delay spread}
 'QCL-TypeB': {Doppler shift, Doppler spread}
 'QCL-TypeC': {Doppler shift, average delay}
 'QCL-TypeD': {Spatial Rx parameter}.

Spatial Rx parameters may include one or more of: angle of arrival ("AoA"), Dominant AoA, average AoA, angular spread, Power Angular Spectrum ("PAS") of AoA, average Angle of Departure ("AoD"), PAS of AoD, transmit/receive channel correlation, transmit/receive beamforming, spatial channel correlation etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity (CDD). The procedure used to derive antenna ports from physical antennas may be specific to a device implementation and transparent to other devices.

In some of the embodiments described, a TCI-state associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to quasi co-location type parameter(s) indicated in the corresponding TCI state. A device can receive a configuration of a plurality of transmission configuration indicator states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

Figure 4:
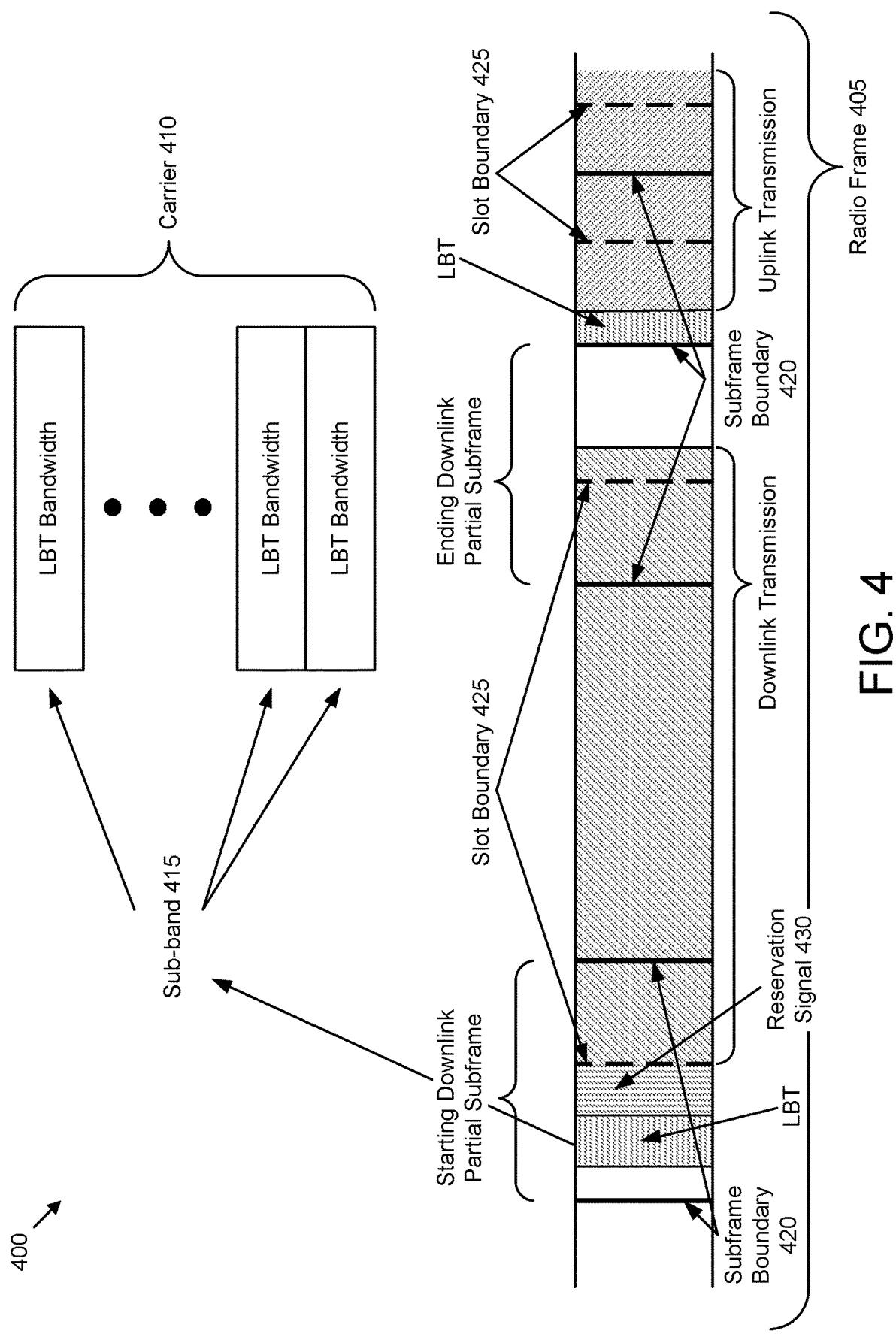
FIG. 4 is a diagram illustrating one embodiment of a radio frame during which LBT procedure is performed.

FIG. 4 depicts an LBT procedure 400 for a radio frame 405 for unlicensed communication, according to embodiments of the disclosure. When a communication channel is a wide bandwidth unlicensed carrier 410 (e.g., several hundred MHz, the CCA/LBT procedure relies on detecting the energy level on multiple sub-bands 415 of the communications channel as shown in FIG. 4. The LBT parameters (such as type/duration, clear channel assessment parameters, etc.) are configured in the UE 205 by a RAN node, such as the gNB 210. In one embodiment, the LBT procedure is performed at the PHY layer 230. When performing omni-directional LBT, the entity (i.e., gNB 210 or UE 205) may use an omnidirectional sensing beam. Alternatively, the entity may simultaneously perform directional LBT using multiple beams (i.e., corresponding to multiple device panels) in order to simulate omnidirectional sensing. When performing directional LBT, the entity (i.e., gNB 210 or UE 205) performs LBT for a given beam (i.e., corresponding to a given spatial direction). Note that each directional beam may correspond to one or more device panels.

FIG. 4 also depicts frame structure of the radio frame 405 for unlicensed communication between the UE 205 and gNB 210. The radio frame 405 may be divided into subframes (indicated by subframe boundaries 420) and may be further divided into slots (indicated by slot boundaries 425). The radio frame 405 uses a flexible arrangements where uplink and downlink operations are on the same frequency channel but are separated in time. However, the subframes are not configured as a downlink subframe or an uplink subframe and a particular subframe may be used by either the UE 205 or gNB 210. As discussed previously, LBT is performed prior to a transmission. Where LBT does not coincide with a slot boundary 425, a reservation signal 430 may be transmitted to reserve (i.e., occupy) the channel until the slot boundary is reached and data transmission begins.

Figure 5:
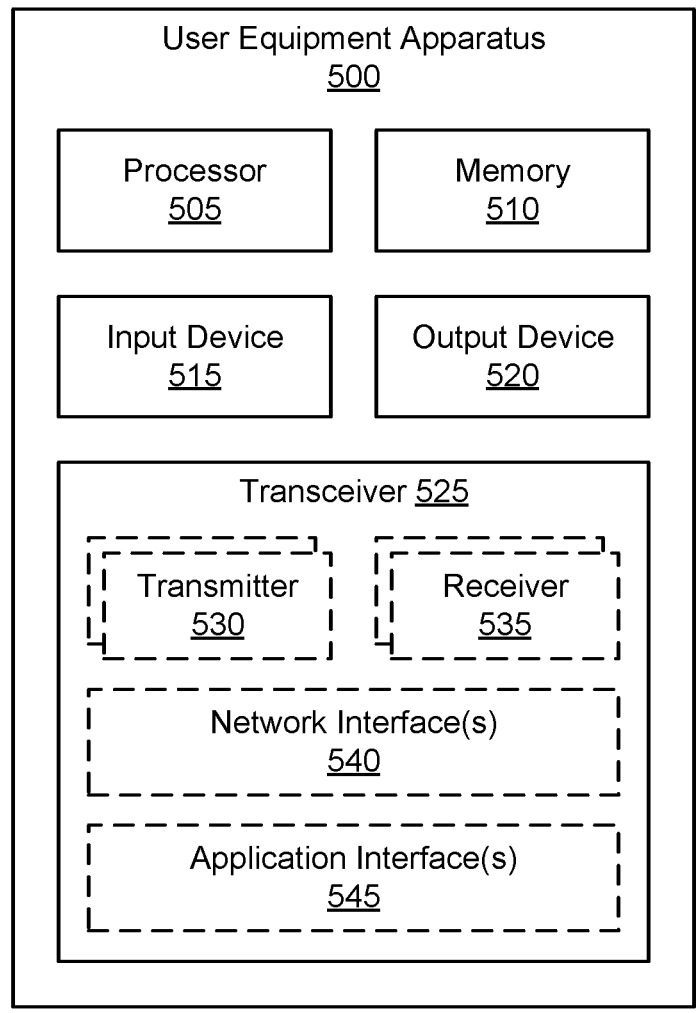
FIG. 5 is a diagram illustrating one embodiment of a user equipment apparatus that may be used for adjusting a contention window size.

FIG. 5 depicts a user equipment apparatus 500 that may be used for adjusting a contention window size, according to embodiments of the disclosure. In various embodiments, the user equipment apparatus 500 is used to implement one or more of the solutions described above. The user equipment apparatus 500 may be one embodiment of the remote unit 105 and/or the UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panel supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525. In certain embodiments, the processor 505 may include an application processor (also known as "main processor") which manages application-domain and operating system ("OS") functions and a baseband processor (also known as "baseband radio processor") which manages radio functions.

In various embodiments, the processor 505 controls the user equipment apparatus 500 to implement the above described UE behaviors. For example, the transceiver 525 initiates a first channel occupancy using at least one transmit beam/panel in response to a successful LBT procedure and transmits a directional transmission using a first transmit beam/panel, the first transmit beam/panel selected from a plurality of transmit beams/panels. Note that while the user equipment apparatus is described in terms of performing a LBT procedure for a "set of transmit panels," in other embodiments LBT may be performed for a "set of transmit beams." As used herein, the term "beam/panel" (or similar notation) indicates that the description applies to a Tx beam and/or panel. Additionally, the descriptions of beams and/or panels also apply to a Tx spatial filter, a Tx spatial setting, a Tx spatial relation, and/or a TCI state.

Further note that the LBT procedure is performed using a sensing beam/panel different than the transmit beam/panel. In one embodiment, there is a one-to-one mapping between the sensing beam/panel and the transmit beam/panel. Here, the transmit beam/panel has a QCL-type D assumption with the corresponding sensing beam/panel. In another embodiment, there is a one-to-many mapping between the sensing beam/panel and the transmit beam/panel. Here, multiple transmit beams/panels have a QCL-type D assumption with the sensing beam/panel.

The processor 505 determines whether the directional transmission was successfully received by a recipient and updates a first contention window size ("CWS") specific to the first transmit beam/panel, where a separate CWS is maintained for each transmit beam/panel that initiates the first channel occupancy. Where there is a one-to-one relationship between the sensing beam/panel and the transmit beam/panel, the first CWS applies to a transmit beam having the QCL-type D assumption with the sensing beam. However, where there is a one-to-many relationship between the sensing beam/panel and the transmit beam/panel, the first CWS applies to each transmit beam sharing the QCL-type D assumption with the sensing beam.

In certain embodiments, updating the first CWS includes: (A) adjusting a CWS to a next allowed value (e.g., selected from a set of predefined values) in response to determining that the directional transmission was not successfully received by the recipient, and (B) setting the first CWS to a minimum value in response to determining that the directional transmission was successfully received by the recipient. The processor 505 performs a subsequent LBT procedure using the updated first CWS prior to a subsequent directional transmission using the first transmit beam/panel.

In some embodiments, determining whether the directional transmission was successfully received by the recipient includes receiving HARQ feedback corresponding to the directional transmission using a first receive beam/panel. In such embodiments, updating the first CWS depends on the HARQ feedback generated for the first transmit beam/panel (e.g., ACK or NACK), where updating the CWS does not depend on the first receive beam/panel (i.e., does not depend on the beam carrying HARQ-ACK feedback of the data channel). As an example, the directional transmission may be a PUSCH transmission, where the CWS adjustment does not depend on the receive beam/panel that received, e.g., PDCCH carrying HARQ feedback for the PUSCH transmission. As another example, the directional transmission may be a PSSCH transmission, where the CWS adjustment does not depend on the receive beam/panel that received, e.g., PSFCH carrying HARQ feedback for the PSSCH transmission.

In certain embodiments, the directional transmission contains a data transmission on a sidelink channel (e.g., PSSCH) where common HARQ-NACK feedback resources are configured (i.e., PSFCH Option 1). In such embodiments, the absence of negative HARQ feedback (i.e., absence of HARQ-NACK) corresponding to the directional transmission indicates that the directional transmission was successfully received by the recipient, such that updating the first CWS includes setting the first CWS to the minimum value in response to detecting the absence of HARQ-NACK feedback.

In certain embodiments, the received HARQ feedback includes a plurality of feedback responses. In such embodiments, the directional transmission is determined to be successfully received by the recipient in response to at least one of the plurality of feedback responses being a positive response (i.e., ACK), such that updating the first CWS includes setting the first CWS to the minimum value in response to at least one of the plurality of feedback responses being a positive response.

In some embodiments, determining whether the directional transmission was successfully received by the recipient includes receiving an NDI and determining whether the directional transmission was successful based on the NDI. In certain embodiments, the NDI being toggled as compared to a previous state indicates that the directional transmission was successfully received by the recipient, where the NDI not being toggled as compared to a previous state indicates that the directional transmission was not successfully received by the recipient. "Toggled" means that a bit value is switched (as compared to its previous state), therefore an NDI would be considered "toggled" if its previous value were a '1' and its current value is '0.' Conversely, an NDI would be considered "untoggled" if its current value is a 1' and its previous value was also '1.'

In some embodiments, determining whether the directional transmission was successfully received by the recipient includes detecting expiry of a retransmission timer (i.e., the CG re-transmission timer) for a HARQ process corresponding to the directional transmission. In such embodiments, the expiry of the retransmission timer indicates that the directional transmission was not successfully received by the recipient.

In some embodiments, the directional transmission is associated with a first CAPC, wherein the CWS values are based on the first CAPC, the method further including maintaining a separate set of CWS values for each of a plurality of CAPCs, the plurality of CAPCs including the first CAPC. In some embodiments, the directional transmission comprises UCI sent on a data channel (i.e., PUCCH). In such embodiments, updating the first CWS depends on HARQ feedback generated for the data channel In some embodiments, adjusting the first CWS to the next allowed value comprises increasing the first CWS according to the function: $\min(CW \times 2+1, CW_{max})$, where the value 'CW' represents a current value of the first CWS, where the value '$CW_{max}$' represents a maximum value for the first CWS, and where the function selects the smallest of the two candidate values. In certain embodiments, the processor 505 tracks a number of times the first CWS is used while at the maximum value for the first transmit beam/panel. In such embodiments, if the first CWS is a maximum value then the next allowed value is the maximum value until a threshold number of uses occurs, wherein the first CWS is reset to the minimum value for the first transmit beam/panel in response to reaching the threshold number of uses. In certain embodiments, the updating the first CWS comprises maintaining a current value of the first CWS. In further embodiments, the minimum value (i.e., '$CW_{min}$') for the first CWS and the maximum value (i.e., '$CW_{max}$') for the first CWS are based on a CAPC of the directional transmission.

In some embodiments, the processor 505 performs a second LBT procedure to initiate a second channel occupancy for a second transmit beam/panel different than the first channel occupancy while directional transmission using the first transmit beam/panel is ongoing. In such embodiments, the transmitter may transmit a data TB using a transmit beam/panel having a lowest CWS at a time the LBT (i.e., CCA) procedure is started, said transmit beam/panel being selected from the first transmit beam/panel and the second transmit beam/panel. In certain embodiments, the processor 505 stops the ongoing directional transmission using the first transmit beam/panel in response to beginning the second LBT procedure. In further embodiments, a second CWS corresponding to the second transmit beam/panel is adjusted independently of the first CWS according to a CAPC value used when performing the LBT procedures.

In various embodiments, the processor 505 performs a LBT procedure for a set of transmit beams/panels. As described above, the LBT procedure may be performed sequentially (i.e., in TDM manner) or in parallel. Additionally, the processor 505 performs a PUCCH transmission on at least one beam/panel of the set of transmit beam/panel in response to successful LBT for a transmit beam/panel and determines whether the PUCCH transmission was successfully received by a RAN node (e.g., gNB 210). The processor 505 updates a CWS corresponding to each beam/panel used in the PUCCH transmission, wherein a separate CWS is maintained for each transmit beam/panel.

In certain embodiments, updating each CWS includes: (A) adjusting a CWS to a next allowed value (e.g., selected from a set of predefined values) in response to determining that the PUCCH transmission using a corresponding transmit beam/panel was not successfully received by the RAN node, and (B) setting the CWS to a minimum value in response to determining that the PUCCH transmission was successfully received by the RAN node.

In some embodiments, the processor 505 receives (i.e., via the transceiver 525) a plurality of NDIs for a plurality HARQ processes corresponding to the PUCCH transmission and determines a HARQ feedback error rate based on the plurality of NDIs and HARQ feedback reported in the PUCCH transmission. In such embodiments, the PUCCH transmission is determined to be successfully received by the RAN node in response to the HARQ feedback error rate being below a threshold value, such that the CWS of each beam/panel used in the PUCCH transmission is set to the minimum value (i.e., '$CW_{min}$') if the HARQ feedback error rate is below the threshold.

In some embodiments, the processor 505 receives receiving a set of DAI values corresponding to the PUCCH transmission. In such embodiments, determining whether the PUCCH transmission was successfully received by the RAN node comprises comparing the set of DAI values to HARQ feedback reported in the PUCCH transmission. In some embodiments, determining whether the PUCCH transmission was successfully received by the RAN node includes receiving a CWS adjustment indicator from the RAN node. In such embodiments, updating the CWS includes adjusting the CWS value according to the adjustment indicator.

In some embodiments, adjusting each CWS to the next allowed value comprises increasing the CWS according to the function: $\min(CW \times 2+1, CW_{max})$, where the value 'CW' represents a current value of the CWS, where the value '$CW_{max}$' represents a maximum value for the CWS, and where the function selects the smallest of the two candidate values. In further embodiments, the minimum value (i.e., '$CW_{min}$') and the maximum value (i.e., '$CW_{max}$') for each CWS is based on a CAPC of the PUCCH transmission. In certain embodiments, the updating each CWS comprises maintaining a current value of the CWS.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to adjusting a contention window size. For example, the memory 510 may store various parameters, panel/beam configurations, resource assignments, policies, and the like as described above. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some II) embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
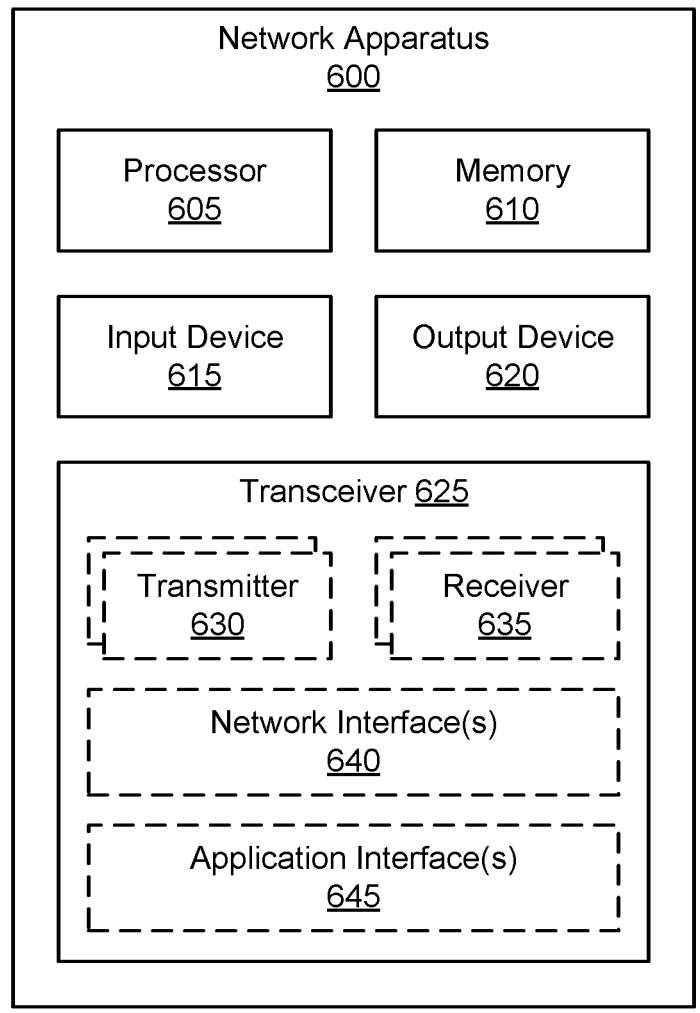
FIG. 6 is a diagram illustrating one embodiment of a network apparatus that may be used for adjusting a contention window size.

FIG. 6 depicts a network apparatus 600 that may be used for adjusting a contention window size, according to embodiments of the disclosure. In one embodiment, network apparatus 600 may be one implementation of a RAN node, such as the base unit 121 and/or gNB 210, described above. Furthermore, the base network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network apparatus 600 is a RAN node (e.g., gNB 210) that sends UE configurations and receives measurement reports, as described herein. In such embodiments, the processor 605 controls the network apparatus 600 to perform the above described RAN behaviors. When operating as a RAN node, the processor 605 may include an application processor (also known as "main processor") which manages application-domain and operating system ("OS") functions and a baseband processor (also known as "baseband radio processor") which manages radio functions.

In various embodiments, the processor 605 controls the transceiver 625 to initiate a first channel occupancy using at least one transmit beam/panel in response to a successful LBT procedure and transmit a directional transmission using a first transmit beam/panel, the first transmit beam/panel selected from a plurality of transmit beams/panels. As discussed above, the LBT procedure is performed using a sensing beam/panel different than the transmit beam/panel, where there may be, e.g., a one-to-one mapping between the sensing beam/panel and the transmit beam/panel or a one-to-many mapping between the sensing beam/panel and the transmit beam/panel.

The processor 605 determines, at the communication device, whether the directional transmission was successfully received by a recipient and updates a first CWS specific to the first transmit beam/panel, where a separate CWS is maintained for each transmit beam/panel that initiates the first channel occupancy. Note that while the network apparatus is described in terms of performing a LBT procedure for a "set of transmit panels," in other embodiments LBT may be performed for a "set of transmit beams." As used herein, the term "beam/panel" (or similar notation) indicates that the description applies to a Tx beam and/or panel. Additionally, the descriptions of beams and/or panels also apply to a Tx spatial filter, a Tx spatial setting, a Tx spatial relation, and/or a TCI state.

In one embodiment, updating the first CWS includes adjusting a first CWS to a next allowed value (e.g., where the CWS value is selected from a set of predefined values) in response to determining that the directional transmission was not successfully received by the recipient. In another embodiment, updating the first CWS includes setting the first CWS to a minimum value (i.e., 'CWmin') in response to determining that the directional transmission was successfully received by the recipient. The processor 605 performs a subsequent LBT procedure using the updated first CWS prior to a subsequent directional transmission using the first transmit beam/panel.

In some embodiments, determining whether the directional transmission was successfully received by the recipient comprises receiving HARQ feedback corresponding to the directional transmission using a first receive beam/panel. In such embodiments, updating the first CWS depends on the HARQ feedback generated for the first transmit beam/panel (e.g., ACK or NACK), where updating the CWS does not depend on the first receive beam/panel (i.e., does not depend on the beam carrying HARQ-ACK feedback of the data channel). Specifically, the directional transmission may be a PDSCH transmission, where the CWS adjustment does not depend on the receive beam/panel that received PUCCH (or UCI over PUSCH) carrying HARQ feedback for the PDSCH transmission.

In certain embodiments, the received HARQ feedback includes a plurality of feedback responses. In such embodiments, the directional transmission is determined to be successfully received by the recipient in response to at least one of the plurality of feedback responses being a positive response (i.e., ACK), such that updating the first CWS includes setting the first CWS to the minimum value in response to at least one of the plurality of feedback responses being a positive response.

In some embodiments, the directional transmission is associated with a first CAPC, wherein the CWS values are based on the first CAPC, the method further comprising maintaining a separate set of CWS values for each of a plurality of CAPCs, the plurality of CAPCs including the first CAPC.

In some embodiments, adjusting the first CWS to the next allowed value comprises increasing the first CWS according to the function: min(CW×2+1, CWmax), where the value 'CW' represents a current value of the first CWS, where the value 'CWmax' represents a maximum value for the first CWS, and where the function selects the smallest of the two candidate values.

In certain embodiments, the processor 605 tracks a number of times the first CWS is used while at the maximum value for the first transmit beam/panel. In such embodiments, if the first CWS is a maximum value then the next allowed value is the maximum value until a threshold number of uses occurs, wherein the first CWS is reset to the minimum value for the first transmit beam/panel in response to reaching the threshold number of uses. In certain embodiments, the updating the first CWS comprises maintaining a current value of the first CWS. In further embodiments, the minimum value (i.e., CWmin') for the first CWS and the maximum value (i.e., 'CWmax') for the first CWS are based on a CAPC of the directional transmission.

In some embodiments, the processor 605 performs a second LBT procedure to initiate a second channel occupancy for a second transmit beam/panel different than the first channel occupancy while directional transmission using the first transmit beam/panel is ongoing.

In such embodiments, the transmitter may transmit a data transmission block ("TB") using a transmit beam/panel having a lowest CWS at a time the LBT (i.e., CCA) procedure is started, said transmit beam/panel being selected from the first transmit beam/panel and the second transmit beam/panel.

In certain embodiments, the processor 605 stops the ongoing directional transmission using the first transmit beam/panel in response to beginning the second LBT procedure. In further embodiments, a second CWS corresponding to the second transmit beam/panel is adjusted independently of the first CWS according to a CAPC value used when performing the LBT procedures.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to adjusting a contention window size. For example, the memory 610 may store parameters, configurations, resource assignments, policies, and the like, as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the PLMN and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

Figure 7:
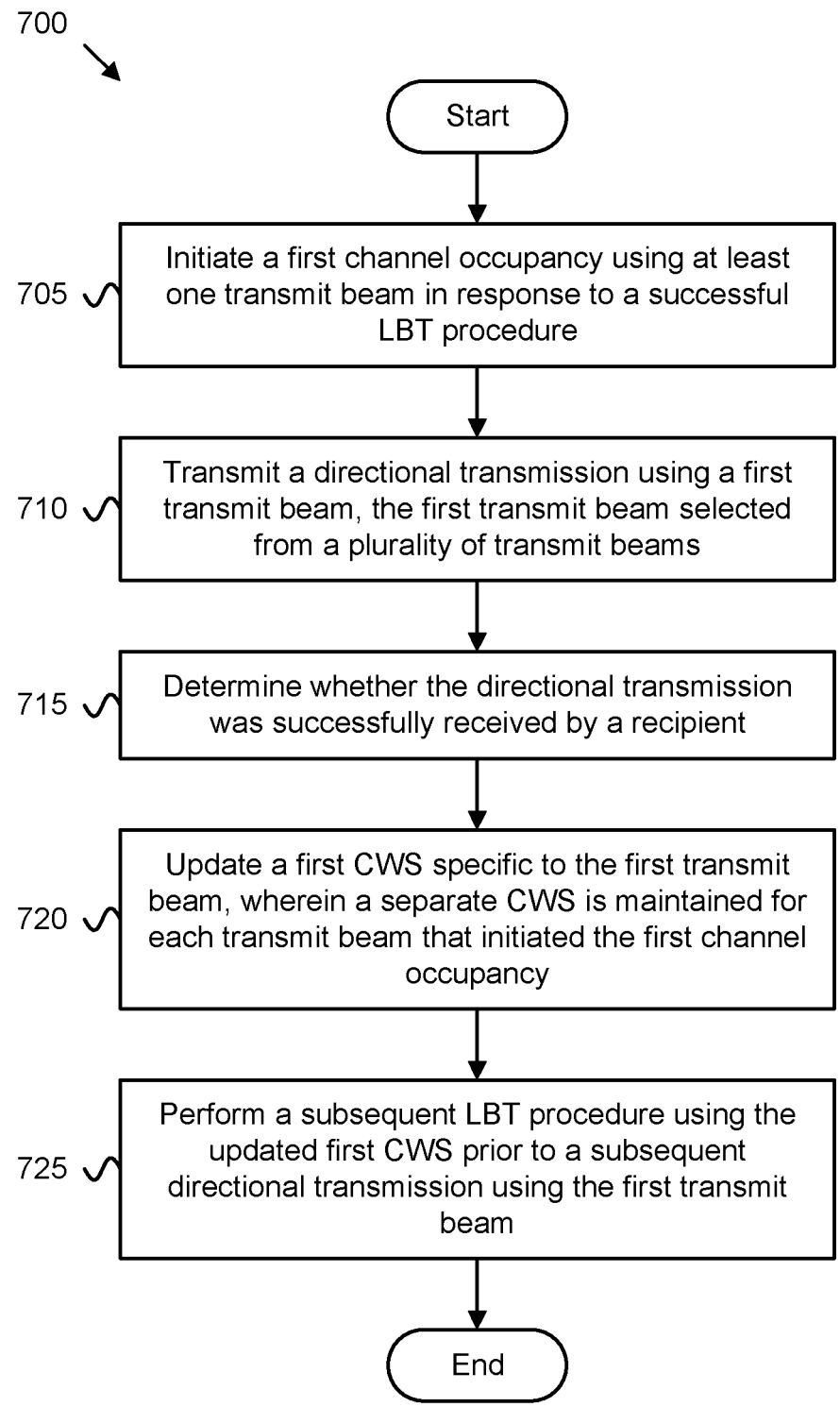
FIG. 7 is a flowchart diagram illustrating one embodiment of a method for adjusting a contention window size.

FIG. 7 depicts one embodiment of a method 700 for adjusting a contention window size, according to embodiments of the disclosure. In various embodiments, the method 700 is performed by a radio communication device in a mobile communication network, such as the remote unit 105, the base unit 121, the UE 205, the gNB 210, the user equipment apparatus 500 and/or the network apparatus 600, described above. In some embodiments, the method 700 is performed by a processor, such as a microcontroller, a microprocessor, a CPU, a GPU, an auxiliary processing unit, a FPGA, or the like.

The method 700 begins and initiates 705 a first channel occupancy using at least one transmit beam in response to a successful Listen-Before-Talk ("LBT") procedure. The method 700 includes transmitting 710 a directional transmission using a first transmit beam, the first transmit beam selected from a plurality of transmit beams. The method 700 includes determining 715 whether the directional transmission was successfully received by a recipient. The method 700 includes updating 720 a first contention window size ("CWS") specific to the first transmit beam, wherein a separate CWS is maintained for each transmit beam that initiated the first channel occupancy.

In one embodiment, updating 720 the first CWS includes adjusting a first CWS to a next allowed value in response to determining that the directional transmission was not successfully received by the recipient. In another embodiment, updating 720 the first CWS includes setting the first CWS to a minimum value in response to determining that the directional transmission was successfully received by the recipient. The method 700 includes performing 725 a subsequent LBT procedure using the updated first CWS prior to a subsequent directional transmission using the first transmit beam. The method 700 ends.

Figure 8:
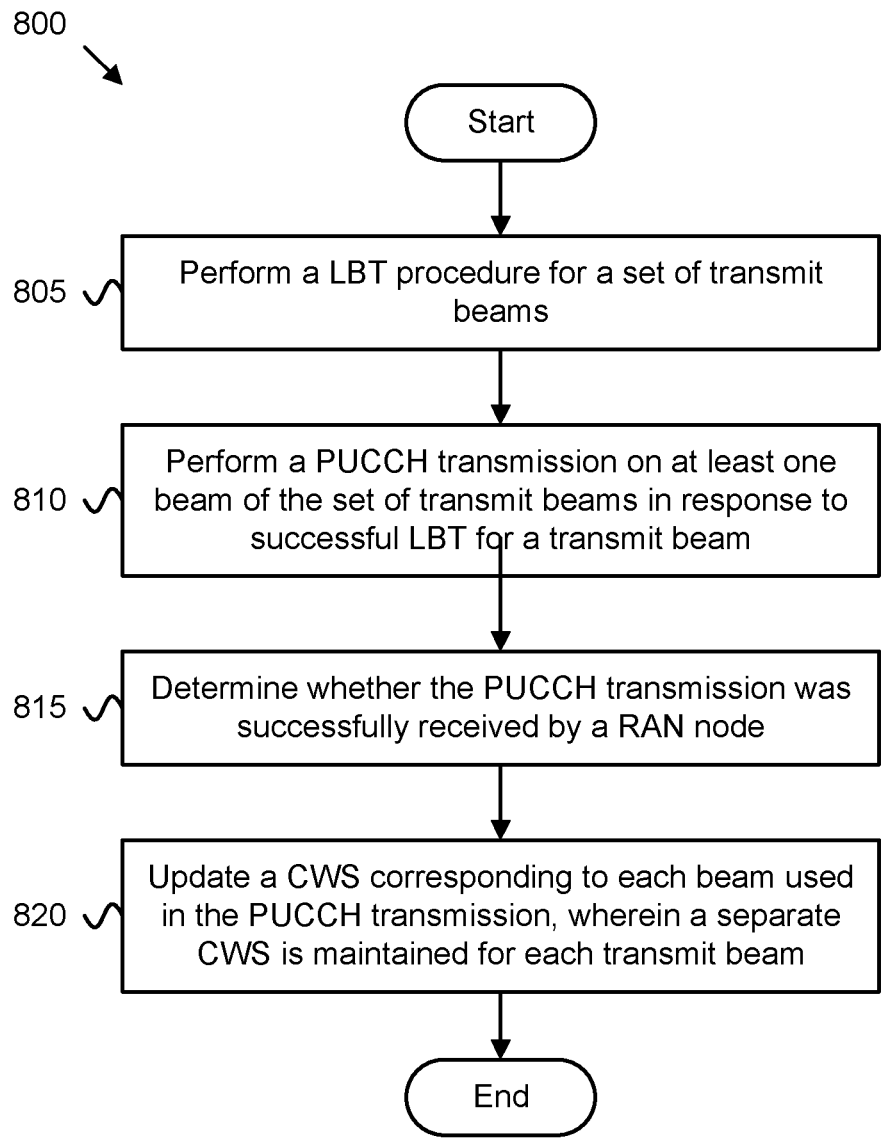
FIG. 8 is a flowchart diagram illustrating one embodiment of a method for adjusting a contention window size.

FIG. 8 depicts one embodiment of a method 800 for adjusting a contention window size, according to embodiments of the disclosure. In various embodiments, the method 800 is performed by a user equipment device in a mobile communication network, such as the remote unit 105, the UE 205, and/or the user equipment apparatus 500, described above. In some embodiments, the method 800 is performed by a processor, such as a microcontroller, a microprocessor, a CPU, a GPU, an auxiliary processing unit, a FPGA, or the like.

The method 800 begins and performs 805 a LBT procedure for a set of transmit beams. As describes above, the LBT procedure may be performed sequentially (i.e., in TDM manner) or in parallel. The method 800 includes performing 810 a PUCCH transmission on at least one beam of the set of transmit beams in response to successful LBT for a transmit beam. The method 800 includes determining 815 whether the PUCCH transmission was successfully received by a RAN node.

The method 800 includes updating 820 a CWS corresponding to each beam used in the PUCCH transmission, wherein a separate CWS is maintained for each transmit beam. In one embodiment, each CWS is adjusted to a next allowed value in response to determining that the PUCCH transmission was not successfully received by the RAN node (i.e., where the CWS value is selected from a set of predefined values). In another embodiment, each CWS is set to a minimum value (i.e., 'CWmin') in response to determining that the PUCCH transmission was successfully received by the RAN node. The method 800 ends.

Disclosed herein is a first apparatus for adjusting a contention window size, according to embodiments of the disclosure. The first apparatus may be implemented by a radio communication device in a mobile communication network, such as the remote unit 105, the base unit 121, the UE 205, the gNB 210, the user equipment apparatus 500 and/or the network apparatus 600, described above. The first apparatus includes a processor and a transceiver comprising a plurality of transmit panels. The transceiver initiates a first channel occupancy using at least one transmit panel in response to a successful Listen-Before-Talk ("LBT") procedure and transmits a directional transmission using a first transmit panel, the first transmit panel selected from a plurality of transmit panels. The processor determines whether the directional transmission was successfully received by a recipient and updates a first contention window size ("CWS") specific to the first transmit panel, where a separate CWS is maintained for each transmit panel that initiates the first channel occupancy.

In one embodiment, updating the first CWS includes adjusting a first CWS to a next allowed value (e.g., where the CWS value is selected from a set of predefined values) in response to determining that the directional transmission was not successfully received by the recipient. In another embodiment, updating the first CWS includes setting the first CWS to a minimum value (i.e., 'CWmin') in response to determining that the directional transmission was successfully received by the recipient. The processor performs a subsequent LBT procedure using the updated first CWS prior to a subsequent directional transmission using the first transmit panel. Note that while the first apparatus is described in terms of using a "transmit panels" and updating a CWS for a first transmit panel, in other embodiments the first method may involve "transmit beams" and may update a CWS for a first transmit beam.

In some embodiments, determining whether the directional transmission was successfully received by the recipient comprises receiving Hybrid Automatic Repeat Request ("HARQ") feedback corresponding to the directional transmission using a first receive panel. In such embodiments, updating the first CWS depends on the HARQ feedback generated for the first transmit panel (e.g., ACK or NACK), where updating the CWS does not depend on the first receive panel (i.e., does not depend on the beam carrying HARQ-ACK feedback of the data channel).

In certain embodiments, the directional transmission comprises a data transmission on a sidelink channel (e.g., PSSCH) where common HARQ-NACK feedback resources are configured (i.e., PSFCH Option 1). In such embodiments, the absence of negative HARQ feedback (i.e., absence of HARQ-NACK) corresponding to the directional transmission indicates that the directional transmission was successfully received by the recipient, such that updating the first CWS includes setting the first CWS to the minimum value in response to detecting the absence of HARQ-NACK feedback.

In certain embodiments, the received HARQ feedback includes a plurality of feedback responses. In such embodiments, the directional transmission is determined to be successfully received by the recipient in response to at least one of the plurality of feedback responses being a positive response (i.e., ACK), such that updating the first CWS includes setting the first CWS to the minimum value in response to at least one of the plurality of feedback responses being a positive response.

In certain embodiments, determining whether the directional transmission was successfully received by the recipient includes receiving a New Data Indicator ("NDI") and determining whether the directional transmission was successful based on the NDI. In certain embodiments, the NDI being toggled as compared to a previous state indicates that the directional transmission was successfully received by the recipient, where the NDI not being toggled as compared to a previous state indicates that the directional transmission was not successfully received by the recipient.

In certain embodiments, determining whether the directional transmission was successfully received by the recipient comprises detecting expiry of a retransmission timer (i.e., the CG re-transmission timer) for a HARQ process corresponding to the directional transmission. In such embodiments, the expiry of the retransmission timer indicates that the directional transmission was not successfully received by the recipient.

In some embodiments, the directional transmission is associated with a first channel access priority class ("CAPC"), wherein the CWS values are based on the first CAPC. In such embodiments, the processor maintains a separate set of CWS values for each of a plurality of CAPCs, the plurality of CAPCs including the first CAPC. In some embodiments, the directional transmission comprises uplink control information ("UCI") sent on a data channel (i.e., PUSCH). In such embodiments, updating the first CWS depends on HARQ feedback generated for the data channel In some embodiments, adjusting the first CWS to the next allowed value comprises increasing the first CWS according to the function: min(CW×2+1, CWmax), where the value 'CW' represents a current value of the first CWS, where the value 'CWmax' represents a maximum value for the first CWS, and where the function selects the smallest of the two candidate values. In further embodiments, the minimum value (i.e., 'CWmin') for the first CWS and the maximum value (i.e., 'CWmax') for the first CWS are based on a CAPC of the directional transmission.

In certain embodiments, the processor tracks a number of times the first CWS is used while at the maximum value for the first transmit panel. In such embodiments, if the first CWS is a maximum value then the next allowed value is the maximum value until a threshold number of uses occurs, wherein the first CWS is reset to the minimum value for the first transmit panel in response to reaching the threshold number of uses. In certain embodiments, the updating the first CWS comprises maintaining a current value of the first CWS.

In some embodiments, the processor performs a second LBT procedure to initiate a second channel occupancy for a second transmit panel different than the first channel occupancy while directional transmission using the first transmit panel is ongoing. In such embodiments, the transmitter may transmit a data transmission block ("TB") using a transmit panel having a lowest CWS at a time the LBT (i.e., CCA) procedure is started, said transmit panel being selected from the first transmit panel and the second transmit panel.

In certain embodiments, the processor stops the ongoing directional transmission using the first transmit panel in response to beginning the second LBT procedure. In further embodiments, a second CWS corresponding to the second transmit panel is adjusted independently of the first CWS according to a CAPC value used when performing the LBT procedures.

Disclosed herein is a first method for adjusting a contention window size, according to embodiments of the disclosure. The first method may be performed by a radio communication device in a mobile communication network, such as the remote unit 105, the base unit 121, the UE 205, the gNB 210, the user equipment apparatus 500 and/or the network apparatus 600, described above. The first method includes initiating a first channel occupancy using at least one transmit beam in response to a successful LBT procedure and transmitting a directional transmission using a first transmit beam, the first transmit beam selected from a plurality of transmit beams. The first method includes determining, at the communication device, whether the directional transmission was successfully received by a recipient and updating a first CWS specific to the first transmit beam, where a separate CWS is maintained for each transmit beam that initiates the first channel occupancy. Note that while the first method is described in terms of using a "transmit beam selected from a plurality of transmit beams," in other embodiments the first method may involve a "transmit panel selected from a plurality of transmit panels."

In one embodiment, updating the first CWS includes adjusting a first CWS to a next allowed value (e.g., where the CWS value is selected from a set of predefined values) in response to determining that the directional transmission was not successfully received by the recipient. In another embodiment, updating the first CWS includes setting the first CWS to a minimum value in response to determining that the directional transmission was successfully received by the recipient. The first method includes performing a subsequent LBT procedure using the updated first CWS prior to a subsequent directional transmission using the first transmit beam.

In some embodiments, determining whether the directional transmission was successfully received by the recipient includes receiving HARQ feedback corresponding to the directional transmission using a first receive beam. In such embodiments, updating the first CWS depends on the HARQ feedback (i.e., ACK or NACK) generated for the first transmit beam, where updating the CWS does not depend on the first receive beam (i.e., does not depend on the beam carrying HARQ-ACK feedback of the data channel).

In certain embodiments, the directional transmission includes a data transmission on a sidelink channel (e.g., PSSCH) where common HARQ-NACK feedback resources are configured (i.e., PSFCH Option 1). In such embodiments, the absence of negative HARQ feedback (i.e., absence of HARQ-NACK) corresponding to the directional transmission indicates that the directional transmission was successfully received by the recipient, such that updating the first CWS includes setting the first CWS to the minimum value in response to detecting the absence of HARQ-NACK feedback. In certain embodiments, the received HARQ feedback comprises a plurality of feedback responses. In such embodiments, the directional transmission is determined to be successfully received by the recipient in response to at least one of the plurality of feedback responses being a positive response (i.e., ACK), such that updating the first CWS includes setting the first CWS to the minimum value in response to at least one of the plurality of feedback responses being a positive response.

In some embodiments, determining whether the directional transmission was successfully received by the recipient includes receiving an NDI and determining whether the directional transmission was successful based on the NDI. In certain embodiments, the NDI being toggled as compared to a previous state indicates that the directional transmission was successfully received by the recipient, where the NDI not being toggled as compared to a previous state indicates that the directional transmission was not successfully received by the recipient.

In some embodiments, determining whether the directional transmission was successfully received by the recipient includes detecting expiry of a retransmission timer (i.e., the CG re-transmission timer) for a HARQ process corresponding to the directional transmission. In such embodiments, the expiry of the retransmission timer indicates that the directional transmission was not successfully received by the recipient.

In some embodiments, the directional transmission is associated with a first CAPC, where the CWS values are based on the first CAPC. In such embodiments, the first method further includes maintaining a separate set of CWS values for each of a plurality of CAPCs, the plurality of CAPCs including the first CAPC. In some embodiments, the directional transmission comprises UCI sent on a data channel (i.e., PUSCH). In such embodiments, updating the first CWS depends on HARQ feedback generated for the data channel In some embodiments, adjusting the first CWS to the next allowed value comprises increasing the first CWS according to the formula: min(CW×2+1, CWmax), where the value "CW" represents a current value of the first CWS, where the value "CWmax" represents a maximum value for the first CWS, and where the function selects the smallest of the two candidate values. In further embodiments, the minimum value (i.e., 'CWmin') for the first CWS and the maximum value (i.e., 'CWmax') for the first CWS are based on a CAPC of the directional transmission.

In certain embodiments, the first method includes tracking a number of times the first CWS is used while at the maximum value for the first transmit beam, wherein if the first CWS is a maximum value then the next allowed value is the maximum value until a threshold number of uses occurs, wherein the first CWS is reset to the minimum value for the first transmit beam in response to reaching the threshold number of uses. In certain embodiments, the updating the first CWS comprises maintaining a current value of the first CWS.

In some embodiments, the first method includes performing a second LBT procedure to initiate a second channel occupancy for a second transmit beam different than the first channel occupancy by a first transmit beam while directional transmission using the first transmit beam is ongoing. In such embodiments, the first method may further include transmitting a data TB using a transmit beam having a lowest CWS at a time the LBT procedure is started, said transmit beam being selected from the first transmit beam and the second transmit beam.

In certain embodiments, the first method further includes stopping the ongoing directional transmission using the first transmit beam in response to beginning the second LBT procedure. In further embodiments, a second CWS corresponding to the second transmit beam is adjusted independently of the first CWS according to a CAPC value used when performing the LBT procedures.

Disclosed herein is a second apparatus for adjusting a contention window size, according to embodiments of the disclosure. The second apparatus may be implemented by a user equipment device in a mobile communication network, such as the remote unit 105, the UE 205, and/or the user equipment apparatus 500, described above. The second apparatus includes a processor and a transceiver comprising plurality of transmit panels. The processor performs a LBT procedure for a set of transmit panels. As described above, the LBT procedure may be performed sequentially (i.e., in TDM manner) or in parallel.

The processor performs a Physical Uplink Control Channel ("PUCCH") transmission on at least one panel of the set of transmit panel in response to successful LBT for a transmit panel and determines whether the PUCCH transmission was successfully received by a Radio Access Network ("RAN") node. The processor updates a CWS corresponding to each panel used in the PUCCH transmission, wherein a separate CWS is maintained for each transmit panel. In one embodiment, the processor updates each CWS by adjusting a CWS to a next allowed value in response to determining that the PUCCH transmission was not successfully received by the RAN node (e.g., where the CWS value is selected from a set of predefined values). In another embodiment, the processor updates each CWS by setting the CWS to a minimum value (i.e., 'CWmin') in response to determining that the PUCCH transmission was successfully received by the RAN node. As noted above, while the second apparatus is described in terms of performing LBT for a plurality of transmit panels and updating CWS for each panel used in PUCCH transmission, in other embodiments the second apparatus may perform LBT for a plurality of transmit beam and update CWS for each beam used in PUCCH transmission.

In some embodiments, the processor receives (i.e., via the transceiver) a plurality of NDIs for a plurality HARQ processes corresponding to the PUCCH transmission and determines a HARQ feedback error rate based on the plurality of NDIs and HARQ feedback reported in the PUCCH transmission. In such embodiments, the PUCCH transmission is determined to be successfully received by the RAN node in response to the HARQ feedback error rate being below a threshold value, such that the CWS of each panel used in the PUCCH transmission is set to the minimum value (i.e., 'CWmin') if the HARQ feedback error rate is below the threshold.

In some embodiments, the processor receives receiving a set of downlink assignment index ("DAI") values corresponding to the PUCCH transmission. In such embodiments, determining whether the PUCCH transmission was successfully received by the RAN node comprises comparing the set of DAI values to HARQ feedback reported in the PUCCH transmission. In some embodiments, determining whether the PUCCH transmission was successfully received by the RAN node includes receiving a CWS adjustment indicator from the RAN node. In such embodiments, updating the CWS includes adjusting the CWS value according to the adjustment indicator.

In some embodiments, adjusting each CWS to the next allowed value comprises increasing the CWS according to the function: min(CW×2+1, CWmax), where the value 'CW' represents a current value of the CWS, where the value 'CWmax' represents a maximum value for the CWS, and where the function selects the smallest of the two candidate values. In further embodiments, the minimum value (i.e., 'CWmin') and the maximum value (i.e., 'CWmax') for each CWS is based on a CAPC of the PUCCH transmission. In certain embodiments, the updating each CWS comprises maintaining a current value of the CWS.

Disclosed herein is a second method for adjusting a contention window size, according to embodiments of the disclosure. The second method may be performed by a user equipment device in a mobile communication network, such as the remote unit 105, the UE 205, and/or the user equipment apparatus 500, described above. The second method includes performing a LBT procedure for a set of transmit beams. As describes above, the LBT procedure may be performed sequentially (i.e., in TDM manner) or in parallel.

The second method includes performing a PUCCH transmission on at least one beam of the set of transmit beams in response to successful LBT for a transmit beam and determining, at the UE, whether the PUCCH transmission was successfully received by a RAN node. The second method includes updating a CWS corresponding to each beam used in the PUCCH transmission, wherein a separate CWS is maintained for each transmit beam. In one embodiment, each CWS is adjusted to a next allowed value in response to determining that the PUCCH transmission was not successfully received by the RAN node (e.g., where the CWS value is selected from a set of predefined values). In another embodiment, each CWS is set to a minimum value (i.e., 'CWmin') in response to determining that the PUCCH transmission was successfully received by the RAN node. As noted above, while the second method is described in terms of performing LBT for a plurality of transmit panels and updating CWS for each panel used in PUCCH transmission, in other embodiments the second method may perform LBT for a plurality of transmit panels and update CWS for each panel used in PUCCH transmission In some embodiments, the second method includes receiving a plurality of NDIs for a plurality HARQ processes corresponding to the PUCCH transmission and determining a HARQ feedback error rate based on the plurality of NDIs and HARQ feedback reported in the PUCCH transmission. In such embodiments, the PUCCH transmission is determined to be successfully received by the RAN node in response to the HARQ feedback error rate being below a threshold value, such that the CWS of each panel used in the PUCCH transmission is set to the minimum value (i.e., 'CWmin') if the HARQ feedback error rate is below the threshold.

In some embodiments, the second method includes receiving a set of DAI values corresponding to the PUCCH transmission. In such embodiments, determining whether the PUCCH transmission was successfully received by the RAN node comprises comparing the set of DAI values to HARQ feedback reported in the PUCCH transmission. In some embodiments, determining whether the PUCCH transmission was successfully received by the RAN node comprises receiving a CWS adjustment indicator from the RAN node. In such embodiments, updating the CWS comprises adjusting the CWS value according to the adjustment indicator.

In some embodiments, adjusting each CWS to the next allowed value comprises increasing the CWS according to the function: min(CW×2+1, CWmax), where the value 'CW' represents a current value of the CWS, where the value 'CWmax' represents a maximum value for the CWS, and where the function selects the smallest of the two candidate values. In further embodiments, the minimum value (i.e., 'CWmin') and the maximum value (i.e., 'CWmax') for each CWS is based on a CAPC of the PUCCH transmission. In certain embodiments, the updating each CWS comprises maintaining a current value of the CWS.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a processor; and
   a memory coupled to the processor, the processor configured to case the apparatus to:
   initiate a first channel occupancy using at least one transmit beam in response to a successful listen-before-talk (LBT) procedure;
   transmit a directional transmission using a first transmit beam, the first transmit beam selected from a plurality of transmit beams;
   determine, at the apparatus, whether the directional transmission was successfully received by a recipient;
   update a first contention window size (CWS) specific to the first transmit beam,
   wherein, to update the first CWS, the processor is configured to cause the apparatus to:
      adjust a first CWS to a next allowed value in response to determining that the directional transmission was not successfully received by the recipient, and
      set the first CWS to a minimum value in response to determining that the directional transmission was successfully received by the recipient, wherein a separate CWS is maintained for each transmit beam that initiated the first channel occupancy; and
   perform a subsequent LBT procedure using the updated first CWS prior to a subsequent directional transmission using the first transmit beam.

2. The apparatus of claim 1, wherein, to determine whether the directional transmission was successfully received by the recipient, the processor is configured to cause the apparatus to receive hybrid automatic repeat request (HARQ) feedback corresponding to the directional transmission using a first receive beam, wherein the updating of the first CWS depends on the HARQ feedback generated for the first transmit beam, wherein the updating of the CWS does not depend on the first receive beam.

3. The apparatus of claim 2, wherein the directional transmission comprises a data transmission on a sidelink channel where common HARQ-NACK feedback resources are configured, wherein an absence of negative HARQ feedback corresponding to the directional transmission indicates that the directional transmission was successfully received by the recipient, wherein, to update the first CWS, the processor is configured to cause the apparatus to set the first CWS to the minimum value in response to detecting the absence of HARQ-NACK feedback.

4. The apparatus of claim 2, wherein the received HARQ feedback comprises a plurality of feedback responses, wherein the directional transmission is determined to be successfully received by the recipient in response to at least one of the plurality of feedback responses being a positive response, wherein, to update the first CWS, the processor is configured to cause the apparatus to set the first CWS to the minimum value in response to at least one of the plurality of feedback responses being a positive response.

5. The apparatus of claim 1, wherein, to determine whether the directional transmission was successfully received by the recipient, the processor is configured to cause the apparatus to receive a new data indicator (NDI), wherein the NDI being toggled as compared to a previous state indicates that the directional transmission was successfully received by the recipient wherein the NDI not being toggled as compared to a previous state indicates that the directional transmission was not successfully received by the recipient.

6. The apparatus of claim 1, wherein, to determine whether the directional transmission was successfully received by the recipient, the processor is configured to cause the apparatus to detect expiry of a retransmission timer for a hybrid automatic repeat request (HARQ) process corresponding to the directional transmission, where the expiry of the retransmission timer indicates that the directional transmission was not successfully received by the recipient.

7. The apparatus of claim 1, wherein the directional transmission is associated with a first channel access priority class (CAPC), wherein the CWS values are based on the first CAPC, wherein the processor is further configured to cause the apparatus to maintain a separate set of CWS values for each of a plurality of CAPCs, the plurality of CAPCs including the first CAPC.

8. The apparatus of claim 1, wherein the directional transmission comprises uplink control information sent on a data channel, and wherein the updating of the first CWS depends on hybrid automatic repeat request (HARQ) feedback generated for the data channel.

9. The apparatus of claim 1, wherein, to adjust the first CWS to the next allowed value, the processor is configured to cause the apparatus to increase the first CWS according to the formula: min (CW×2+1, CWmax), where CW represents a current value of the first CWS and CWmax represents a maximum value for the first CWS.

10. The apparatus of claim 9, wherein the processor is further configured to cause the apparatus to track a number of times the first CWS is used while at the maximum value for the first transmit beam, wherein if the first CWS is currently at the maximum value then the next allowed value is the maximum value until a threshold number of uses occurs, wherein the first CWS is reset to the minimum value for the first transmit beam in response to reaching the threshold number of uses, wherein the minimum value for the first CWS and the maximum value for the first CWS are based on a channel access priority class of the directional transmission.

11. The apparatus of claim 1, wherein, to update the first CWS, the processor is configured to cause the apparatus to maintain a current value of the first CWS.

12. The apparatus of claim 1, wherein the processor is further configured to cause the apparatus to perform a second LBT procedure to initiate a second channel occupancy for a second transmit beam different than the first channel occupancy while the directional transmission using the first transmit beam is ongoing, wherein a second CWS corresponding to the second transmit beam is adjusted independently of the first CWS according to a channel access priority class (CAPC) value used when performing the LBT procedures.

13. The apparatus of claim 12, wherein the processor is further configured to cause the apparatus to transmit a data transmission block (TB) using a transmit beam having a lowest CWS at a time the subsequent LBT procedure is started, the transmit beam being selected from the first transmit beam and the second transmit beam.

14. The apparatus of claim 12, wherein the processor is further configured to cause the apparatus to stop the directional transmission using the first transmit beam in response to beginning the second LBT procedure.

15. A method of a communication device, the method comprising:
- initiating a first channel occupancy using at least one transmit panel in response to a successful listen-before-talk (LBT) procedure;
- transmitting a directional transmission using a first transmit panel, the first transmit panel selected from a plurality of transmit panels;
- determining whether the directional transmission was successfully received by a recipient;
- updating a first contention window size (CWS) specific to the first transmit panel, wherein updating the first CWS comprises:
  - adjusting a first CWS to a next allowed value in response to determining that the directional transmission was not successfully received by the recipient, and
  - setting the first CWS to a minimum value in response to determining that the directional transmission was successfully received by the recipient, wherein a separate CWS is maintained for each transmit panel that initiated the first channel occupancy; and
- performing a subsequent LBT procedure using the updated first CWS prior to a subsequent directional transmission using the first transmit panel.

16. A user equipment (UE) comprising:
- a processor; and
- a memory coupled to the processor, the processor configured to case the UE to:
  - perform a listen-before-talk (LBT) procedure for a set of transmit beams;
  - perform a physical uplink control channel (PUCCH) transmission on at least one beam of the set of transmit beams in response to successful LBT for a transmit beam;
  - determine, at the UE, whether the PUCCH transmission was successfully received by transmitted to a radio access network (RAN) node; and
  - update a contention window size (CWS) corresponding to each of the at least one beam,
  - wherein, to update each CWS, the processor is configured to cause the UE to:
    - adjust a CWS to a next allowed value in response to determining that the PUCCH transmission was not successfully transmitted to the RAN node, and
    - set the CWS to a minimum value in response to determining that the PUCCH transmission was successfully transmitted to the RAN node, wherein a separate CWS is maintained for each transmit beam.

17. The UE of claim 16, wherein the processor is configured to cause the UE to:
- receive a plurality of new data indicators (NDIs) for a plurality hybrid automatic repeat request (HARQ) processes corresponding to the PUCCH transmission; and
- determine a HARQ feedback error rate based on the plurality of NDIs and HARQ feedback reported in the PUCCH transmission,
- wherein the PUCCH transmission is determined to be successfully transmitted to the RAN node in response to the HARQ feedback error rate being below a threshold value.

18. The UE of claim 16, wherein the processor is configured to cause the UE to:
- receive a set of downlink assignment index (DAI) values corresponding to the PUCCH transmission,
- wherein, to determine whether the PUCCH transmission was successfully transmitted to the RAN node, the processor is configured to cause the UE to compare the set of DAI values to HARQ feedback reported in the PUCCH transmission.

19. The UE of claim 16, wherein, to determine whether the PUCCH transmission was successfully transmitted to the RAN node, the processor is configured to cause the UE to receive a CWS adjustment indicator from the RAN node, wherein, to update the CWS, the processor is configured to cause the UE to adjust the CWS according to the adjustment indicator.

* * * * *